United States Patent
Chaugule et al.

(10) Patent No.: US 11,503,457 B2
(45) Date of Patent: Nov. 15, 2022

(54) SUBSCRIPTION ACTIVATION FOR MOBILE WIRELESS DEVICES

(71) Applicant: Apple Inc., Cupertino, CA (US)

(72) Inventors: Raj S. Chaugule, Santa Clara, CA (US); Li Li, Los Altos, CA (US); Vikram Bhaskara Yerrabommanahalli, Saratoga, CA (US); Chandiramohan Vasudevan, Sunnyvale, CA (US); Damien R. Holzapfel, Campbell, CA (US); Avinash Narasimhan, Cupertino, CA (US); Ameya R. Kasbekar, Bellevue, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/451,477

(22) Filed: Oct. 19, 2021

(65) Prior Publication Data
US 2022/0038887 A1 Feb. 3, 2022

Related U.S. Application Data

(62) Division of application No. 16/902,216, filed on Jun. 15, 2020, now Pat. No. 11,172,350.

(51) Int. Cl.
*H04W 8/18* (2009.01)
*H04W 8/20* (2009.01)
(Continued)

(52) U.S. Cl.
CPC .............. *H04W 8/183* (2013.01); *H04W 4/24* (2013.01); *H04W 4/50* (2018.02); *H04W 4/60* (2018.02);
(Continued)

(58) Field of Classification Search
CPC ......... H04W 8/183; H04W 4/60; H04W 4/50; H04W 12/35; H04W 4/24; H04W 8/205; H04W 12/06
See application file for complete search history.

(56) References Cited

U.S. PATENT DOCUMENTS 8,887,257 B2  11/2014  Haggerty et al.
9,100,810 B2   8/2015  Schell et al.
(Continued)

FOREIGN PATENT DOCUMENTS

CN     111010691 A    4/2020
WO   2012149219 A2   11/2012
(Continued)

*Primary Examiner* — Matthew C Sams
(74) *Attorney, Agent, or Firm* — Dickinson Wright RLLP

(57) ABSTRACT

This Application sets forth techniques for provisioning and activating electronic subscriber identity modules (eSIMs) for mobile wireless devices. An eSIM is reserved during a sales order process and later activated during device activation after receipt by a user. An option for eSIM installation in place of (or in addition to) physical SIM installation is provided when purchasing the mobile wireless device. The reserved eSIM can replace a previous SIM/eSIM or be a new eSIM. During device activation, installation and activation of the eSIM occurs. Activation of the eSIM can occur before or after deactivation of a transferred SIM/eSIM. The mobile wireless device accounts for propagation delay of eSIM activation through MNO servers by disabling and re-enabling the eSIM until initial attachment to an MNO cellular wireless network succeeds or a maximum number of retry attempts is reached.

20 Claims, 20 Drawing Sheets

(51) Int. Cl.
*H04W 4/50* (2018.01)
*H04W 12/06* (2021.01)
*H04W 4/24* (2018.01)
*H04W 4/60* (2018.01)
*H04W 12/30* (2021.01)

(52) U.S. Cl.
CPC ........... *H04W 8/205* (2013.01); *H04W 12/06* (2013.01); *H04W 12/35* (2021.01)

(56) References Cited

U.S. PATENT DOCUMENTS

| | | |
|---|---|---|
| 9,419,970 B2 | 8/2016 | Haggerty et al. |
| 10,200,853 B2 | 2/2019 | Schell et al. |
| 10,327,135 B2 | 6/2019 | Schell et al. |
| 10,394,674 B2 | 8/2019 | Li et al. |
| 10,911,944 B2 | 2/2021 | Schell et al. |
| 11,172,350 B1 * | 11/2021 | Chaugule .............. H04W 4/24 |
| 2012/0108204 A1 | 5/2012 | Schell et al. |
| 2012/0260086 A1 | 10/2012 | Haggerty et al. |
| 2012/0331292 A1 | 12/2012 | Haggerty et al. |
| 2015/0031413 A1 | 1/2015 | Haggerty et al. |
| 2015/0312749 A1 * | 10/2015 | Li ........................ H04W 48/08 455/436 |
| 2018/0060199 A1 | 3/2018 | Li et al. |
| 2019/0246265 A1 | 8/2019 | Schell et al. |
| 2019/0373448 A1 | 12/2019 | Gao |
| 2020/0260241 A1 | 8/2020 | Sicard |
| 2020/0288298 A1 | 9/2020 | Li et al. |
| 2020/0344594 A1 | 10/2020 | Larignon |

FOREIGN PATENT DOCUMENTS

| | | |
|---|---|---|
| WO | 2012167856 A1 | 12/2012 |
| WO | 2018129724 A1 | 7/2018 |
| WO | 2019041086 A1 | 3/2019 |

* cited by examiner

SUBSCRIPTION ACTIVATION FOR MOBILE WIRELESS DEVICES

CROSS-REFERENCE TO RELATED APPLICATIONS

The present application is a divisional of U.S. patent application Ser. No. 16/902,216, entitled "SUBSCRIPTION ACTIVATION FOR MOBILE WIRELESS DEVICES," filed Jun. 15, 2020, issued Nov. 9, 2021 as U.S. Pat. No. 11,172,350, the content of which is incorporated herein by reference in its entirety for all purposes.

FIELD

The described embodiments set forth techniques for provisioning and activating electronic subscriber identity modules (eSIMs) for mobile wireless devices newly purchased via online or retail sales channels. One or more eSIMs are reserved for the mobile wireless device as part of a sales order and later activated when device activation of the mobile wireless device occurs after receipt by a user.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices as embedded UICCs (eUICCs), which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

A mobile wireless device, at initial acquisition by an end user via a sales channel, can include a SIM card associated with a particular MNO, but cannot be ordered with only an eSIM for the MNO. Moreover, mobile wireless devices purchased as SIM-free, can require a user to acquire and insert an active SIM card in order to activate the mobile wireless device for cellular wireless service. There exists a need for methods to provide for purchasing a mobile wireless device with one or more eSIMs reserved for the mobile wireless device and subsequently activated as part of a device activation process performed on the mobile wireless device after acquisition by the user.

SUMMARY

This Application sets forth techniques for provisioning and activating electronic subscriber identity modules (eSIMs) for mobile wireless devices newly purchased via online or retail sales channels. One or more eSIMs are reserved for the mobile wireless device as part of a sales order and later activated when device activation of the mobile wireless device occurs after receipt by a user. During purchase of the mobile wireless device, a user can select an option for eSIM installation in place of (or in addition to) physical SIM installation for access to services of a particular mobile network operator (MNO). The reserved eSIM can be used to replace a previously used SIM/eSIM for an existing customer of the MNO, such as when upgrading a mobile wireless device to a new model, or can be a new eSIM for a new mobile wireless device added to an existing customer account or for a new customer account. A phone number associated with the eSIM can be newly assigned or ported from a previous subscription. User verification, to validate enabling subscription to cellular wireless service based on the eSIM for the mobile wireless device, occurs as part of a device activation process for the mobile wireless device. A set of device manufacturer servers can interact with the mobile wireless device and with MNO servers to cause activation of the eSIM for the mobile wireless device. As part of a sales order process, a device manufacturer server receives from an MNO server a message indicating an eSIM is reserved for provisioning to the mobile wireless device, the message including identifiers for the mobile wireless device and for the reserved eSIM. The message also includes an indication whether activation of the eSIM is delayed until device activation of the mobile wireless device. During the device activation process for the mobile wireless device, after receipt of the mobile wireless device by the user, activation of the eSIM is authorized and confirmed by communication between the mobile wireless device and both the device manufacturer servers and the MNO servers. Activation of the eSIM can occur before or after deactivation of a previous eSIM for which subscription service is transferred to the mobile wireless device. In some embodiments, the mobile wireless device accounts for propagation delay of an activation process through MNO servers by disabling and re-enabling the eSIM until initial attachment to a cellular wireless network of the MNO succeeds.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
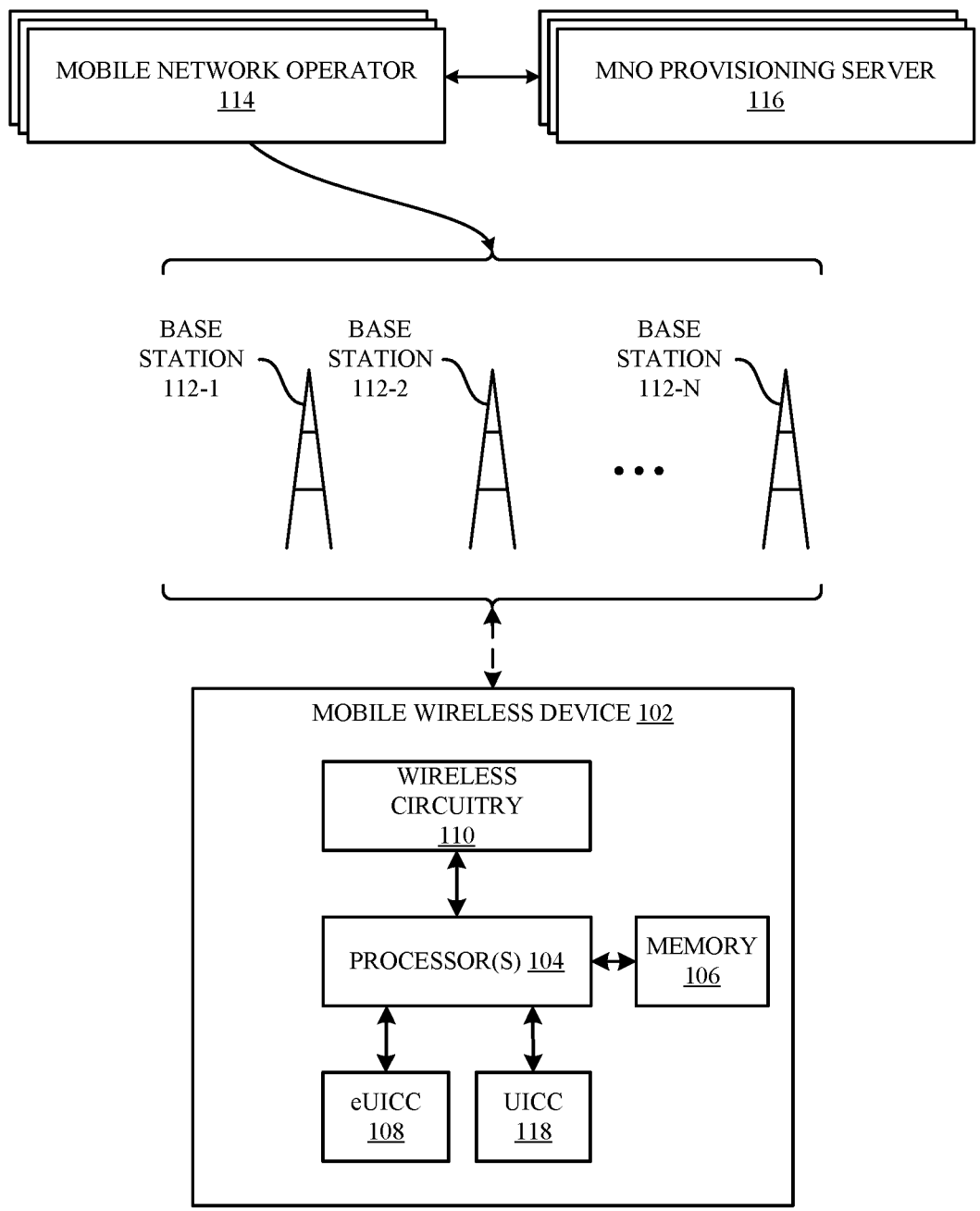
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This Application sets forth techniques for provisioning and activating electronic subscriber identity modules (eSIMs) for mobile wireless devices newly purchased via an online sales channel or via a retail sales channel. One or more eSIMs are reserved for the mobile wireless device as part of a sales order and later activated when device activation of the mobile wireless device occurs after receipt of the mobile wireless device by a user. During purchase of the mobile wireless device, a user can opt for eSIM installation in place of (or in addition to) physical SIM installation for access to cellular wireless services of a particular mobile network operator (MNO). The eSIM option can be a sub-option for a particular MNO selected by the user during the sales order process. The reserved eSIM can be used to replace a previously used SIM/eSIM for an existing customer of the MNO, such as when upgrading a mobile wireless device to a new model. In such case, a phone number of the previous mobile wireless device can be ported to the new mobile wireless device, and a cellular wireless subscription associated with the phone number transferred from the SIM/eSIM of the previous mobile wireless device to the eSIM of the new mobile wireless device. Alternatively, the eSIM can be a new eSIM for installation on a new mobile wireless device that is added to an existing customer account, such when adding a mobile wireless device with a newly assigned phone number (or transferring a phone number from a different customer account to the existing customer account). The eSIM can also be a new eSIM for a new mobile wireless device for a new customer account, for which subscription information can be obtained as part of the sales order process. User verification, to validate enabling subscription to cellular wireless service based on the eSIM for the mobile wireless device, occurs as part of a device activation process for the mobile wireless device.

A set of device manufacturer servers interact with the mobile wireless device and with MNO servers to cause activation of the eSIM for the mobile wireless device. As part of a sales order process, a device manufacturer carrier services server receives from an MNO infrastructure server a message indicating that an eSIM is reserved for a particular mobile wireless device, the message including identifiers for the mobile wireless device and for the reserved eSIM. The message also includes an indication whether activation of the eSIM is delayed until device activation of the mobile wireless device, e.g., for a mobile wireless device shipped to the customer or to be picked up from a retail store at a later time, or whether activation of the eSIM is to occur substantially immediately, e.g., when purchasing and activating a mobile wireless device at a retail store. During the device activation process for the mobile wireless device, after receipt of the mobile wireless device by the user, activation of the eSIM is authorized and confirmed by communication between the mobile wireless device and both the device manufacturer servers and MNO servers. Activation of the eSIM can occur before or after deactivation of a previous SIM/eSIM when a cellular wireless subscription is transferred to the mobile wireless device from a previous mobile wireless device. In some embodiments, the mobile wireless device accounts for propagation delay of an eSIM service activation process through multiple MNO servers, such as by monitoring whether the eSIM has been activated by the cellular wireless network based on successful (or failure of) attachment to a cellular wireless network of the MNO associated with the eSIM. The mobile wireless device can enter a monitor mode and, as required, disable and subsequently re-enable the eSIM until initial attachment to the cellular wireless network of the MNO succeeds or a maximum number of retry attempts to attach to the cellular wireless network is reached.

These and other embodiments are discussed below with reference to FIGS. 1-11; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile wireless device 102, which can also be referred to as a wireless device, a wireless device, a mobile device, a user equipment (UE) and the like, a group of base stations 112-1 to 112-N that are managed by different Mobile Network Operators (MNOs) 114, and a set of provisioning servers 116 that are in communication with the MNOs 114. Additional MNO infrastructure servers, such as used for account management and billing are not shown. The mobile wireless device 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the mobile wireless device 102, and the MNOs 114 can represent different wireless service providers that provide specific cellular wireless services (e.g., voice and data) to which the mobile wireless device 102 can subscribe, such as via a subscription account for a user of the mobile wireless device 102.

As shown in FIG. 1, the mobile wireless device 102 can include processing circuitry, which can include one or more processor(s) 104 and a memory 106, an embedded Universal Integrated Circuit Card (eUICC) 108, and a baseband wireless circuitry 110 used for transmission and reception of cellular wireless radio frequency signals. The baseband wireless circuitry 110 can include analog hardware components, such as antennas and amplifiers, as well as digital processing components, such as signal processors (and/or general/limited purpose processors) and associated memory. In some embodiments, the mobile wireless device 102 includes one or more physical UICCs 118, also referred to as Subscriber Identity Module (SIM) cards, in addition to or substituting for the eUICC 108. The components of the mobile wireless device 102 work together to enable the mobile wireless device 102 to provide useful features to a user of the mobile wireless device 102, such as cellular wireless network access, non-cellular wireless network access, localized computing, location-based services, and Internet connectivity. The eUICC 108 can be configured to store multiple electronic SIMS (eSIMs) for accessing cellular wireless services provided by different MNOs 114 by connecting to their respective cellular wireless networks through base stations 112-1 to 112-N. For example, the eUICC 108 can be configured to store and manage one or more eSIMs for one or more MNOs 114 for different subscriptions to which the mobile wireless device 102 is associated. To be able to access services provided by an MNO, an eSIM is reserved for subsequent download and installation to the eUICC 108. In some embodiments, the eUICC 108 obtains one or more eSIMs from one or more associated provisioning servers 116 as part of a device initialization of the mobile wireless device 102, such as when purchasing a new mobile wireless device 102. The provisioning servers 116 can be maintained by a manufacturer of the mobile wireless device 102, the MNOs 114, third party entities, and the like. Communication of eSIM data between an MNO provisioning server 116 and the eUICC 108 (or between the MNO provisioning server 116 and processing circuitry of the mobile wireless device 102 external to the eUICC 108, e.g., the processor 104) can use a secure communication channel.

The mobile wireless device 102, upon initial acquisition by a user, can lack an activated eSIM and require the user to download a functional eSIM for the MNO 114 from a corresponding MNO provisioning server 116. As part of a sales order process, the user of the mobile wireless device 102 can opt for an eSIM (in place of and/or in addition to a physical SIM) for the mobile wireless device 102. Network-based servers managed by an MNO 114 associated with the eSIM can communicate with additional network-based servers managed by a device manufacturer and/or by a third party entity to integrate a device activation process for the mobile wireless device 102 with provisioning and activation of one or more eSIMs to the mobile wireless device 102. Upon activation of the eSIM, the mobile wireless device 102 can connect to the cellular wireless network of the MNO 114 to access services provided therefrom.

Figure 2:
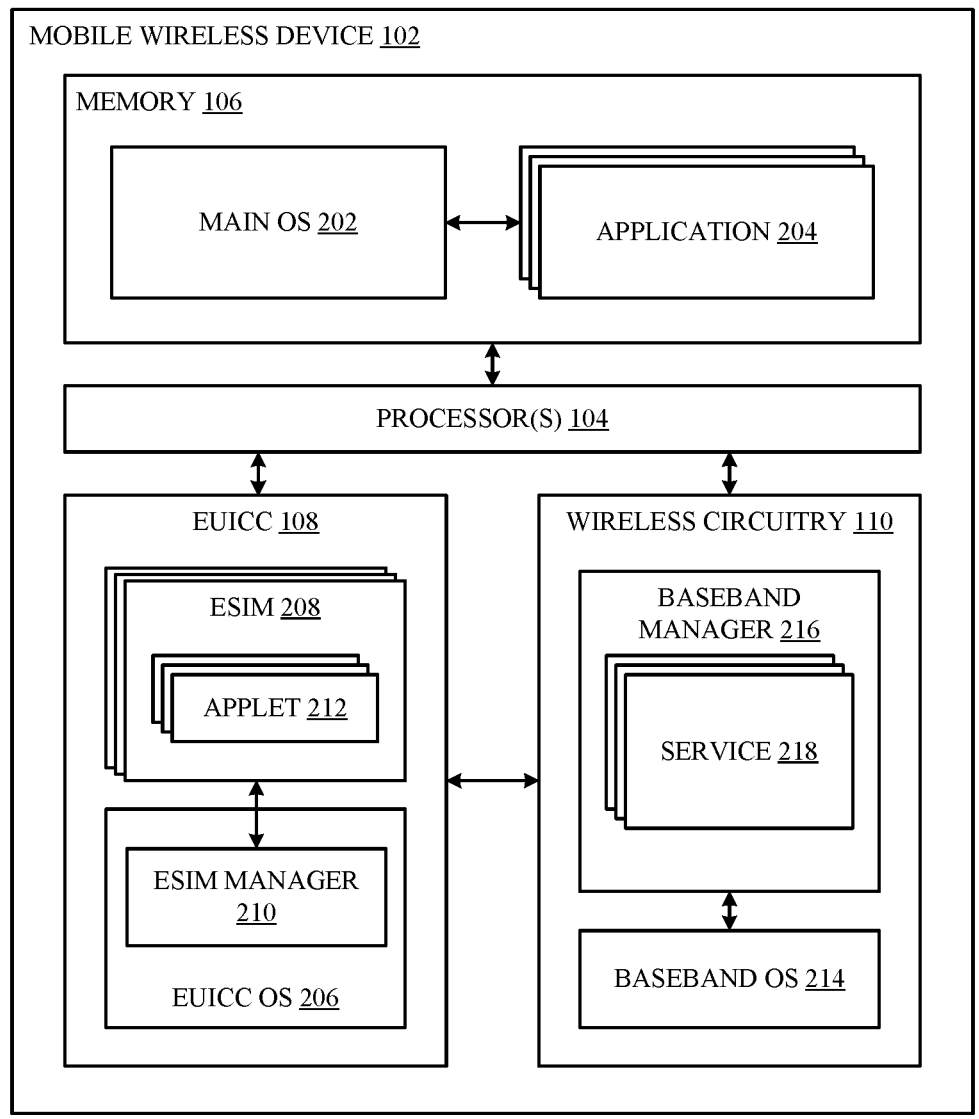
FIG. 2 illustrates a block diagram of a more detailed view of exemplary components of the system of FIG. 1, according to some embodiments.

FIG. 2 illustrates a block diagram of a more detailed view 200 of particular components of the mobile wireless device 102 of FIG. 1, according to some embodiments. As shown in FIG. 2, the processor(s) 104, in conjunction with memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage hardware resources of the eUICC 108 (e.g., a processor and a memory embedded in the eUICC 108). The eUICC OS 206 can also be configured to manage eSIMs 208 that are stored by the eUICC 108, e.g., by downloading, installing, deleting, enabling, disabling, modifying, or otherwise performing management of the eSIMs 208 within the eUICC 108 and providing baseband wireless circuitry 110 with access to the eSIMs 208 to provide access to wireless services for the mobile wireless device 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented in conjunction with baseband wireless circuitry 110 and the eUICC 108, can be configured to enable the mobile wireless device 102 to communicate with an MNO 114 and provide useful features (e.g., phone calls and internet access) to a user of the mobile wireless device 102.

As also shown in FIG. 2, the baseband wireless circuitry 110 of the mobile wireless device 102 can include a baseband OS 214 that is configured to manage hardware resources of the baseband wireless circuitry 110 (e.g., a processor, a memory, different radio components, etc.). According to some embodiments, the baseband wireless circuitry 110 can implement a baseband manager 216 that is configured to interface with the eUICC 108 to establish a secure channel with an MNO provisioning server 116 and obtaining information (such as eSIM data) from the MNO provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3:
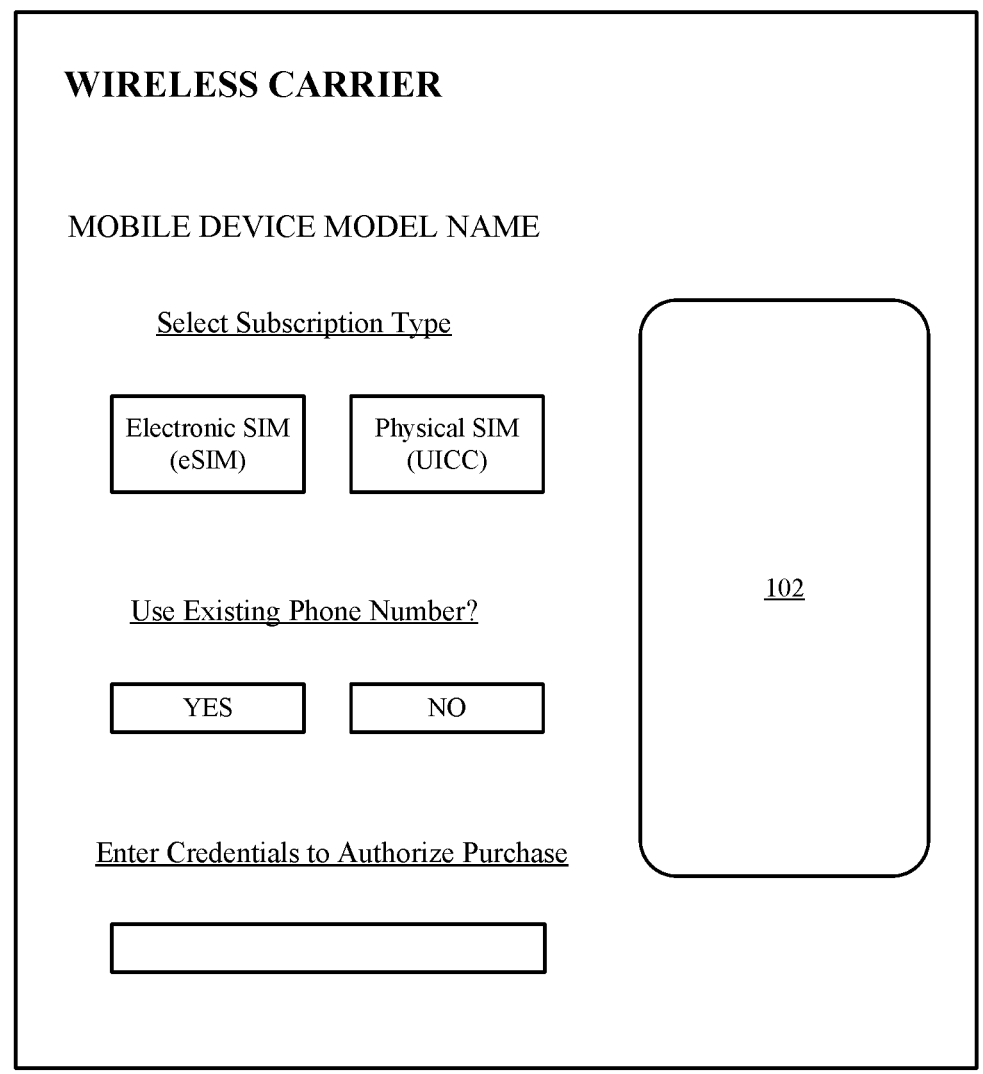
FIG. 3 illustrates an exemplary sales order page including an option for selecting an eSIM subscription for a mobile wireless device, according to some embodiments.

FIG. 3 illustrates a diagram 300 of an exemplary sales order page including an option for selecting an eSIM subscription for a mobile wireless device 102. The eSIM option can be presented along with an option for a physical SIM card (UICC) after a user has selected a particular MNO (wireless carrier) to which to subscribe for access to cellular wireless services for the mobile wireless device 102. The user can purchase the mobile wireless device 102 online via a device manufacturer website, a third party website, an MNO website, or the like. The user can also purchase the mobile wireless device 102 at a retail store, such as provided by the MNO, by the device manufacturer, or by a third party. If the user chooses an eSIM option, then the user can also elect to re-use an existing phone number to port with the eSIM 208 to the mobile wireless device 102 being purchased or to use a new phone number. The use can be asked whether they are an existing customer of the MNO or a new customer and applicable user credential information (to verify an existing customer or to onboard a new customer) can be obtained to authorize purchase of the mobile wireless device 102 and/or transfer of a cellular wireless service subscription to the mobile wireless device 102 (e.g., to use with the eSIM 208 option, if selected).

Figure 4A:
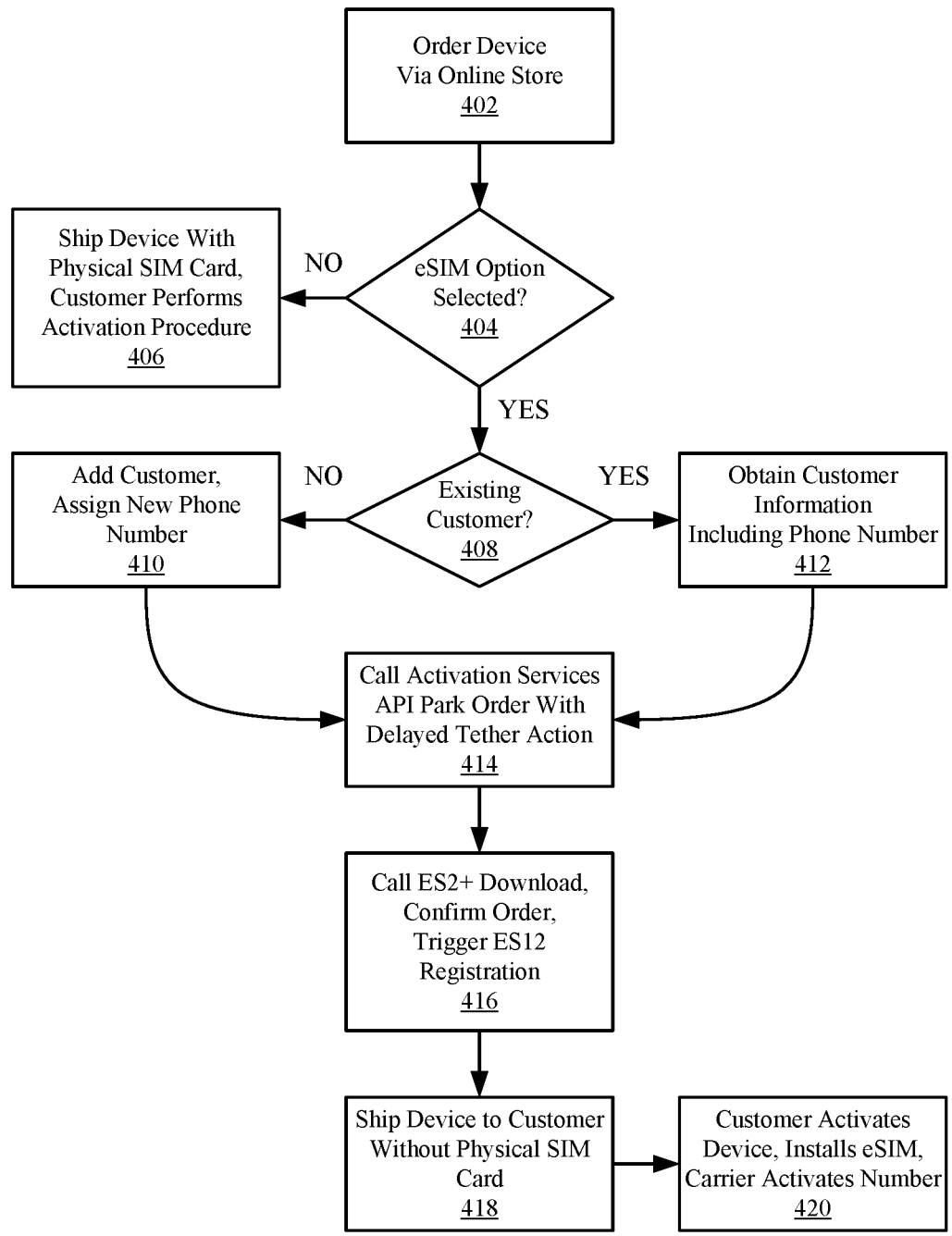
FIGS. 4A, 4B, and 4C illustrate exemplary sequences of actions performed to provision and activate an eSIM for a mobile wireless device, according to some embodiments.

FIG. 4A illustrates a diagram 400 of an exemplary sequence of actions performed to provision and activate an eSIM 208 for a mobile wireless device 102, in particular when reservation of an eSIM 208 for a mobile wireless device 102 during a sales order process is separated substantially in time from installation and activation of the eSIM 208 on a mobile wireless device 102 during a device activation process. At 402, a user can place a sales order for a mobile wireless device 102, e.g., via an online store. At 404, the user can be presented with an option to select an eSIM 208 to be installed on an eUICC 108 of the mobile wireless device 102 and with which to access cellular wireless services, e.g., in place of or in addition to a physical SIM card (UICC 118) to use for cellular wireless service access. The eSIM option can be presented after a user has selected an MNO 114 with which to subscribe for cellular wireless services. If the eSIM option is not selected, then at 406, the mobile wireless device 102 can be configured to include a physical SIM card (UICC 118) and ship to the user (or to another location for user access), and the user can perform an activation procedure for the mobile wireless device 102 that need not include downloading, installation, and/or activation of an eSIM 208 for the mobile wireless device. If the eSIM option is selected, then at 408, the user can indicate whether they are an existing customer of the MNO 114, e.g., have an active cellular wireless service subscription and/or account with the MNO 114. If the user is not an existing customer of the MNO 114, then at 410, the user can provide information for adding a new customer to the MNO 114, and a new phone number can be allocated for use with the eSIM 208 that is to be later installed and activated on the mobile wireless device 102 for access to cellular wireless services of the MNO 114 by the user of the mobile wireless device 102. If the user is an existing customer of the MNO 114, then at 412, customer information can be obtained to verify the user has an active wireless service subscription with an associated phone number to transfer to the mobile wireless device 102 for use with the eSIM 208 and/or an existing customer account to which to add a new phone number for use with the eSIM 208 on the mobile wireless device 102. At 414, an activation services message, e.g., a park order application programming interface (API) message, can be sent by an MNO infrastructure server, as a result of the customer sales order that includes an eSIM option selected, with an indication of a delayed tether action, in which an eSIM 208 is reserved for the mobile wireless device 102 and will be later downloaded to and installed and activated on the mobile wireless device 102. The park order API message can be sent to a device manufacturer MNO services server that communicates with one or more MNOs 114 regarding services for mobile wireless devices 102 of the device manufacturer. At 416, an MNO infrastructure message, e.g., an ES2+ download order message and confirmation message, can be sent by the MNO infrastructure server to an MNO provisioning server 116, which can trigger the MNO provisioning server 116 to send an ES12 register event message to a device manufacturer device services server. The ES12 register event message can indicate that an eSIM 208 is reserved for a particular mobile wireless device 102 that will be shipped to and/or picked up by a user and that the eSIM 208 will be available for subsequent download, installation, and activation on an eUICC 108 of the mobile wireless device 102. At 418, the mobile wireless device 102 is shipped to a user (e.g., a customer that ordered the mobile wireless device 102) without inclusion of a physical SIM card (UICC 118). At 420, a user of the mobile wireless device 102 performs a device activation process, part of which can include downloading and installing the reserved eSIM 208 onto the eUICC 108 of the mobile wireless device 102 and subsequent activation by one or more network-based servers of the MNO 114 to allow for access to cellular wireless services of the MNO 114 based on credentials of the eSIM 208 including in the eUICC 108 of the mobile wireless device 102.

Figure 4B:
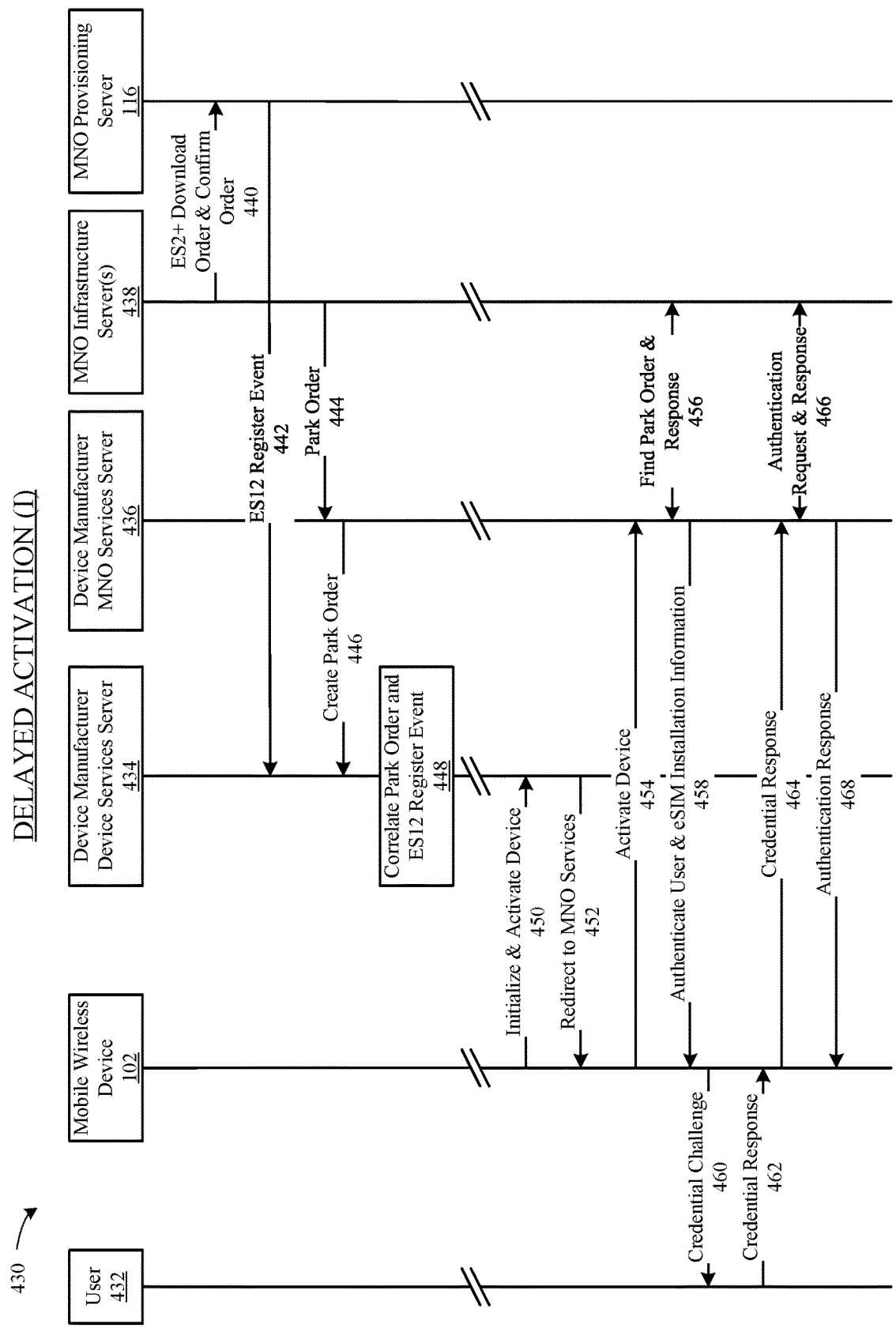
Figure 4C:
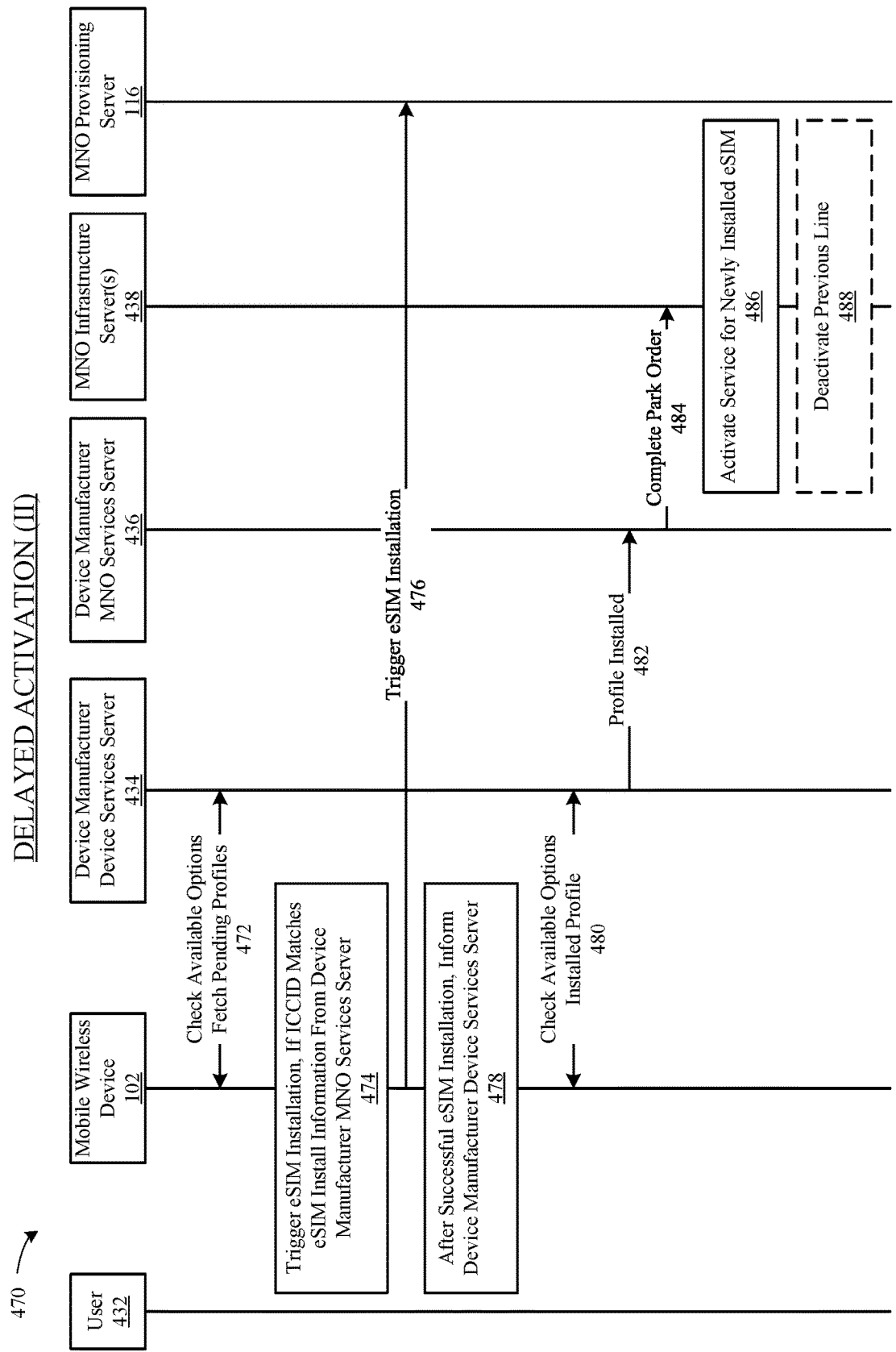

FIGS. 4B and 4C illustrate diagrams 430, 470 of exemplary actions performed by a number of entities to provision and activate an eSIM 208 for a mobile wireless device 102 with delayed activation of the eSIM 208. At 440, an MNO infrastructure server 438 sends an ES2+ download order and confirmation message to an MNO provisioning server 116 in response to receipt of a sales order for a mobile wireless device 102, the sales order including an indication of selection of an eSIM 208 for subsequent download, installation, and activation for the mobile wireless device 102. At 442, the MNO provisioning server 116 sends an ES12 register event message, triggered by the ES2+ download order and confirmation message, to a device manufacturer device services server 434, where the ES12 register event message includes an indication that there is an eSIM 208 (or multiple eSIMs 208) reserved for the mobile wireless device 102. The ES12 register event message can include identifiers for the mobile wireless device 102 and the eSIM(s) 208. Substantially commensurate with the download and register event messages, an MNO infrastructure server 438, at 444, sends a park order message to a device manufacturer MNO services server 436, the park order message indicating a sales order for the mobile wireless device 102 and including at least identifiers for the mobile wireless device 102 and one or more eSIMs 208 for the mobile wireless device 102. The park order message can also include an indication that download, installation, and activation of the one or more eSIMs 208 for the mobile wireless device 102 will occur at a future time (e.g., a delayed tethered action indication). At 446, the device manufacturer MNO services server 436 can forward the park order message (or form and send a similar message) to the device manufacturer device services server 434 to provide information regarding the sales order. At 448, the device manufacturer device services server 434 can correlate information extracted from the park order message, received at 446 from the MNO infrastructure server 438 via the device manufacturer MNO services server 436, with information obtained from the ES12 register event message received at 442 from the MNO provisioning server 116. The actions at 440, 442, 444, 446, and 448 can occur as a result of a sales order process for the mobile wireless device 102 and can be separated in time from subsequent actions that occur as part of a device activation process for the mobile wireless device 102.

At 450, a user (or a sales associate) can initiate a device activation process for the mobile wireless device 102, which can cause the mobile wireless device 102 to send a message to the device manufacturer device services server 434 to activate cellular services for the mobile wireless device 102. At 452, the device manufacturer device services server 434 can redirect the mobile wireless device 102 to the device manufacturer MNO services server 436. At 454, the mobile wireless device 102 can send a message to the device manufacturer MNO services server 436 to activate cellular services for the mobile wireless device 102. At 456, the device manufacturer MNO services server 436 can send a message to the MNO infrastructure server 438 to locate and confirm the previously indicated park order for the mobile wireless device 102 and subsequently receive a response from the MNO infrastructure server 438 confirming an order status for the park order and information usable for authentication of a user of the mobile wireless device 102. At 458, the device manufacturer MNO services server sends a message to the mobile wireless device 102 to authenticate the user of the mobile wireless device 102. The message sent to the mobile wireless device 102 can also include information for installation of the reserved eSIM for the mobile wireless device 102. At 460, the mobile wireless device 102 can present a credential challenge, e.g., via a display of the mobile wireless device 102 requesting an input to authenticate a user 432 of the mobile wireless device 102, and subsequently, at 462, the mobile wireless device 102 can receive the credential response, which can be forwarded to the device manufacturer MNO services server 436 to authenticate the user 432 of the mobile wireless device 102 with the MNO infrastructure server 438 at 466. The device manufacturer MNO services server 436 obtains an authentication response at 466 and forwards the authentication response from the device to the mobile wireless device 102 at 468. With authentication of the user 432 successful, the mobile wireless device 102, at 472, can query the device manufacturer device services server 434 for information about one or more pending eSIMs 208 reserved and available for download and installation on the mobile wireless device 102. In some embodiments, the mobile wireless device 102 uses a check available options message to obtain the information regarding the one or more pending eSIMs 208. When, at 474, an identifier, e.g., an integrated circuit card identifier (ICCID) value, of an eSIM 208 indicated in the information received, by the mobile wireless device 102 from the device manufacturer device services server 434 at 472, matches to a corresponding identifier, e.g., ICCID value, from eSIM installation information, received by the mobile wireless device 102 from the device manufacturer MNO services server 436 at 458, the mobile wireless device 102 can trigger download and installation of the identified eSIM 208 from an MNO provisioning server 116 at 476. When eSIM download and installation succeeds, at 478, the mobile wireless device 102 informs the device manufacturer device services server 434 of the successful installation of the eSIM (profile) 208 at 480. In some embodiments, the mobile wireless device 102 uses a check available options message to inform the device manufacturer device services server 434 of the successful eSIM installation. At 482, the device manufacturer device services server 434 sends a message to the device manufacturer MNO services server 436 of the successful installation of the eSIM 208, and, at 484, the device manufacturer MNO services server 436 sends a message to the MNO infrastructure server 438, e.g., a complete park order message, indicating the successful installation of the eSIM 208 on the mobile wireless device 102. At 486, one or more MNO infrastructure servers 438 can cause cellular wireless service for the newly installed eSIM 208 to be activated for the mobile wireless device 102. In some embodiments, such as when a previous phone number or a corresponding cellular wireless service subscription is transferred from a previous mobile wireless device 102 to the mobile wireless device 102 as a result of the newly installed eSIM 208, a corresponding previous SIM card (UICC 118) or eSIM 208 of the previous mobile wireless device 102 can be deactivated at 488.

Figure 5A:
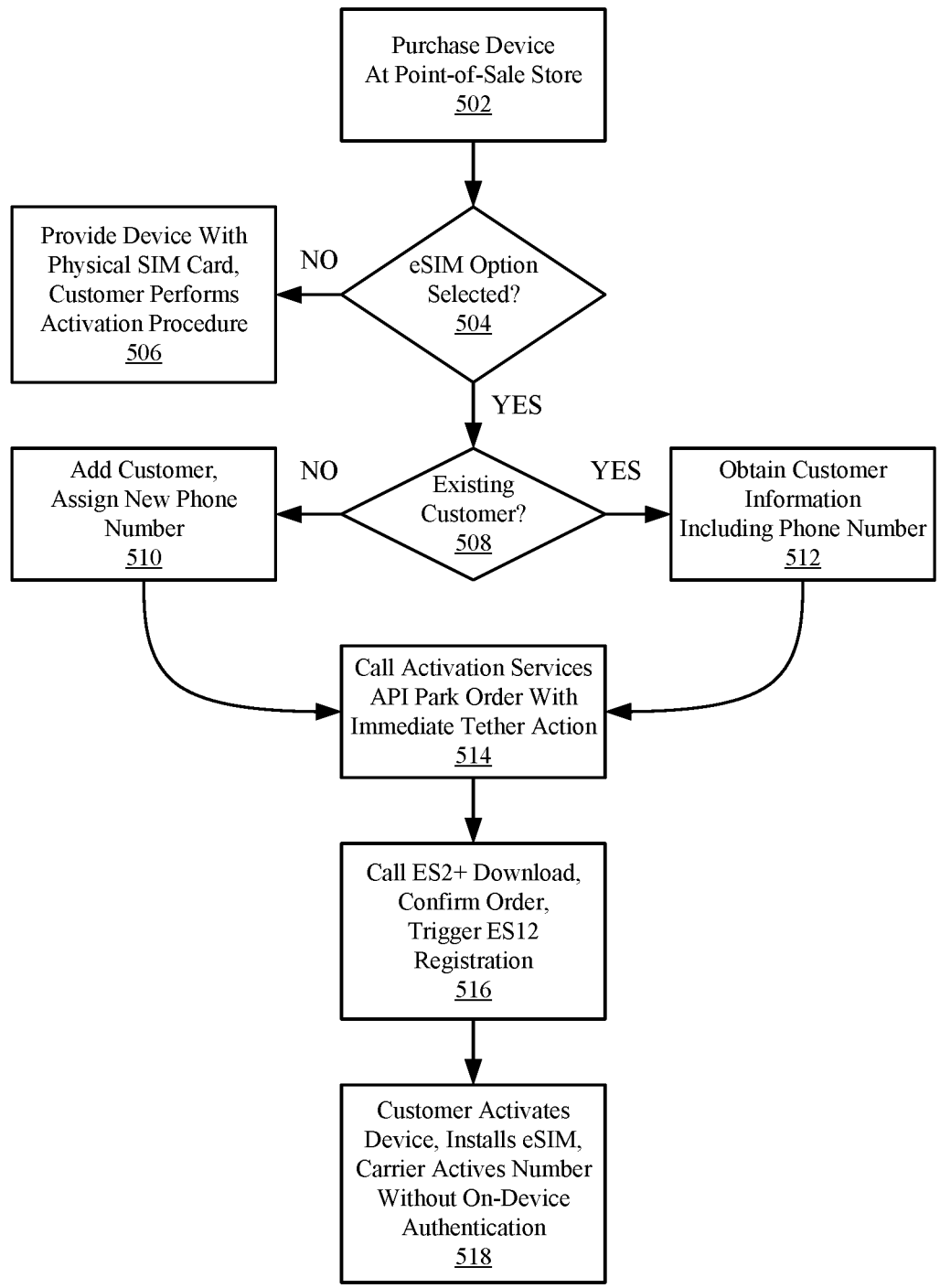
FIGS. 5A, 5B, and 5C illustrate additional exemplary sequences of actions performed to provision and activate an eSIM for a mobile wireless device, according to some embodiments.

FIG. 5A illustrates a diagram 500 of another exemplary sequence of actions performed to provision and activate an eSIM 208 for a mobile wireless device 102, in particular when reservation of an eSIM 208 for the mobile wireless device 102 during a sales order process occurs substantially close in time with installation and activation of the eSIM 208 on the mobile wireless device 102 during a device activation process. At 502, a user purchases a mobile wireless device 102 at a point-of-sale retail location, such as managed by a device manufacturer, an MNO, or a third party. At 504, the user opt for an eSIM 208 to be installed on an eUICC 108 of the mobile wireless device 102 and with which to access cellular wireless services, e.g., in place of or in addition to a physical SIM card (UICC 118) to use for cellular wireless service access. If the eSIM option is not selected, then at 506, the mobile wireless device 102 can be configured with a physical SIM card (UICC 118) and provided to the user, and, subsequently, the user can perform an activation procedure for the mobile wireless device 102 that need not include downloading, installation, and/or activation of an eSIM 208 for the mobile wireless device. If the eSIM option is selected, then at 508, the user can provide information about whether they are an existing customer of the MNO 114, e.g., have an active cellular wireless service subscription and/or account with the MNO 114. If the user is not an existing customer of the MNO 114, then at 510, the user can provide information for adding a new customer to the MNO 114, and a new phone number can be allocated for use with the eSIM 208 that is to be installed and activated on the mobile wireless device 102 for access to cellular wireless services of the MNO 114 by the user of the mobile wireless device 102. If the user is an existing customer of the MNO 114, then at 512, customer information can be obtained to verify the user has an active wireless service subscription with an associated phone number to transfer to the mobile wireless device 102 for use with the eSIM 208 and/or an existing customer account to which to add a new phone number for use with the eSIM 208 on the mobile wireless device 102. Information obtained at 510/512 can be used for authentication of a user of the mobile wireless device 102 to obtain an eSIM 208 to access cellular wireless services. Authentication information can be provided to appropriate network-based servers, e.g., managed by a device manufacturer and/or by an MNO 114 to cause an installation and activation process for the eSIM 208 to proceed. At 514, an activation services message, e.g., a park order application programming interface (API) message, can be sent by an MNO infrastructure server 438, as a result of the customer sales order that includes an eSIM option selected, with an indication of an immediate (now) tether action, in which an eSIM 208 is to be reserved for downloading, installation, and activation on the mobile wireless device 102. The park order API message can be sent to a device manufacturer MNO services server 436 that communicates with one or more MNOs 114 regarding services for mobile wireless devices 102 of the device manufacturer. At 516, an MNO infrastructure message, e.g., an ES2+ download order message and confirmation message, can be sent by the MNO infrastructure server 438 to an MNO provisioning server 116, which can trigger the MNO provisioning server 116 to send an ES12 register event message to a device manufacturer device services server 434. The ES12 register event message can indicate that an eSIM 208 is reserved for a particular mobile wireless device 102 and that the eSIM 208 will be available for download, installation, and activation on an eUICC 108 of the mobile wireless device 102. At 518, a user of the mobile wireless device 102 performs a device activation process, part of which can include downloading and installing the reserved eSIM 208 onto the eUICC 108 of the mobile wireless device 102 and subsequent activation by one or more network-based servers of the MNO 114 to allow for access to cellular wireless services of the MNO 114 based on credentials of the eSIM 208 including in the eUICC 108 of the mobile wireless device 102. Authentication of the user need not occur at 518, as authentication credentials for the user can occur as part of the earlier sales order process.

Figure 5B:
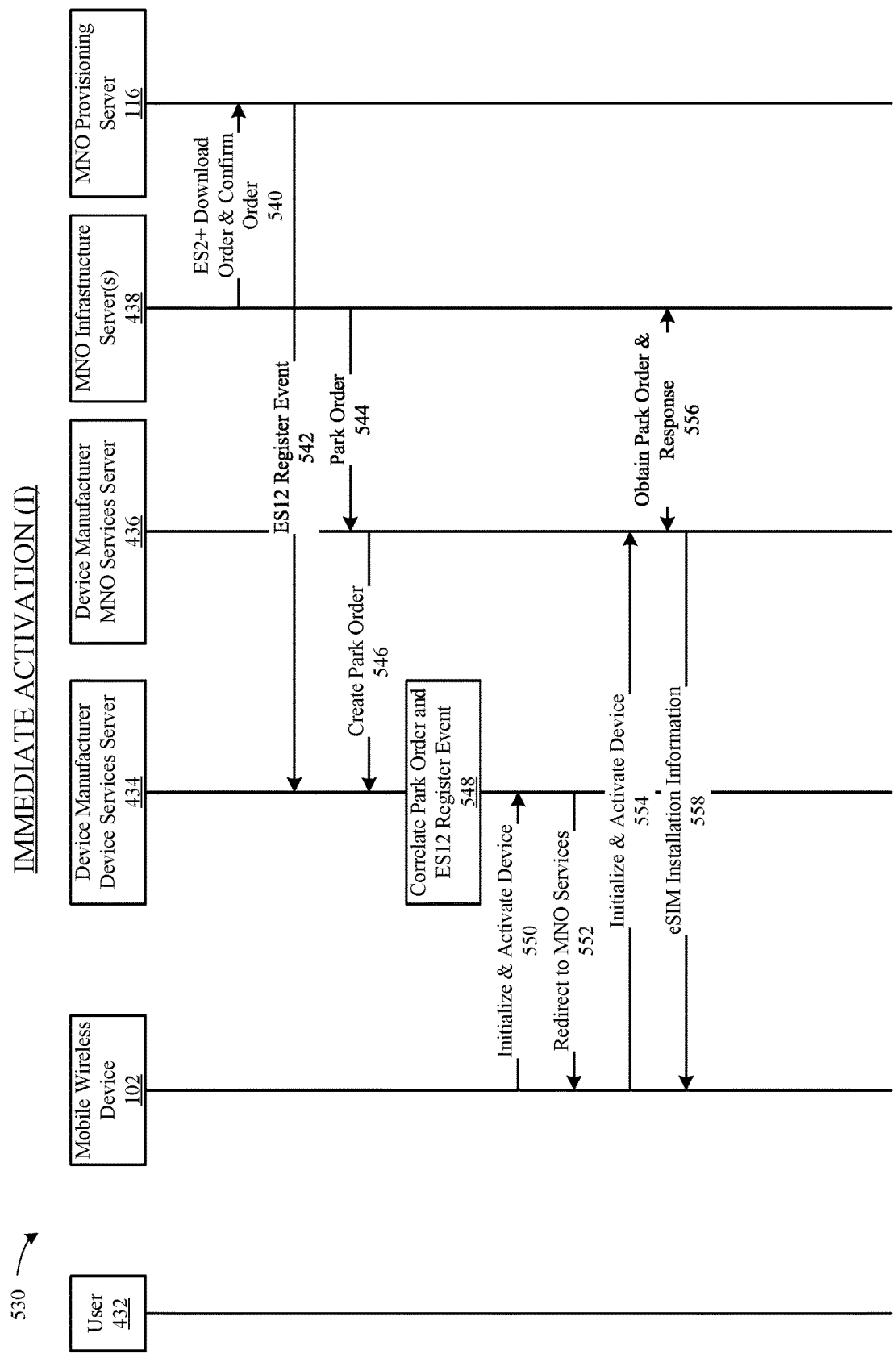
Figure 5C:
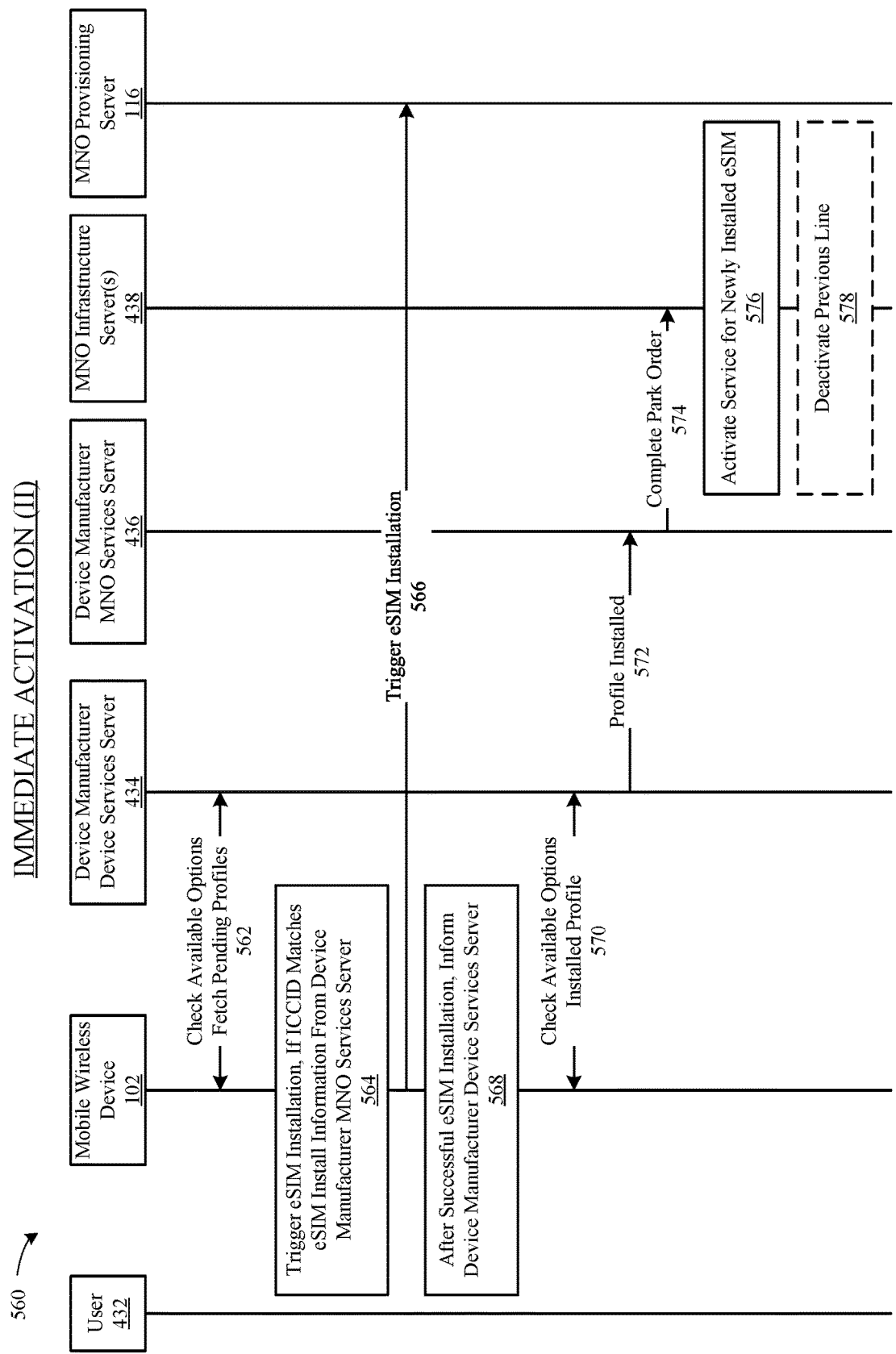

FIGS. 5B and 5C illustrate diagrams 530, 560 of exemplary actions performed by a number of entities to provision and activate an eSIM 208 for a mobile wireless device 102 with immediate activation of the eSIM 208. At 540, an MNO infrastructure server 438 sends an ES2+ download order and confirmation message to an MNO provisioning server 116 in response to receipt of a sales order for a mobile wireless device 102, the sales order including an indication of selection of an eSIM 208 for subsequent download, installation, and activation for the mobile wireless device 102. At 542, the MNO provisioning server 116 sends an ES12 register event message, triggered by the ES2+ download order and confirmation message, to a device manufacturer device services server 434, where the ES12 register event message includes an indication that there is an eSIM 208 (or multiple eSIMs 208) reserved for the mobile wireless device 102. The ES12 register event message can include identifiers for the mobile wireless device 102 and the eSIM(s) 208. Substantially commensurate with the download and register event messages, an MNO infrastructure server 438, at 544, sends a park order message to a device manufacturer MNO services server 436, the park order message indicating a sales order for the mobile wireless device 102 and including at least identifiers for the mobile wireless device 102 and one or more eSIMs 208 for the mobile wireless device 102. The park order message can also include an indication that download, installation, and activation of the one or more eSIMs 208 for the mobile wireless device 102 will occur substantially commensurate with purchase of the mobile wireless device 102 (e.g., an immediate tethered action indication). At 446, the device manufacturer MNO services server 436 can forward the park order message (or form and send a similar message) to the device manufacturer device services server 434 to provide information regarding the sales order. At 448, the device manufacturer device services server 434 can correlate information extracted from the park order message, received at 446 from the MNO infrastructure server 438 via the device manufacturer MNO services server 436, with information obtained from the ES12 register event message received at 442 from the MNO provisioning server 116.

At 550, a user (or a sales associate) can initiate a device activation process for the mobile wireless device 102, which can cause the mobile wireless device 102 to send a message to the device manufacturer device services server 434 to activate cellular services for the mobile wireless device 102. At 552, the device manufacturer device services server 434 can redirect the mobile wireless device 102 to the device manufacturer MNO services server 436. At 554, the mobile wireless device 102 can send a message to the device manufacturer MNO services server 436 to activate cellular services for the mobile wireless device 102. At 556, the device manufacturer MNO services server 436 can send a message to the MNO infrastructure server 438 to locate and confirm the previously indicated park order for the mobile wireless device 102 and subsequently receive a response from the MNO infrastructure server 438 confirming an order status for the park order. At 558, the device manufacturer MNO services server 436 can provide eSIM installation information for the reserved eSIM 208 to the mobile wireless device 102. The mobile wireless device 102, at 562, can query the device manufacturer device services server 434 for information about one or more pending eSIMs 208 available for download and installation on the mobile wireless device 102. In some embodiments, the mobile wireless device 102 uses a check available options message to obtain the information regarding the one or more pending eSIMs 208. When, at 564, an identifier, e.g., an integrated circuit card identifier (ICCID) value, of an eSIM 208 indicated in the information received, by the mobile wireless device 102 from the device manufacturer device services server 434 at 562, matches to a corresponding identifier, e.g., ICCID value, from eSIM installation information, received by the mobile wireless device 102 from the device manufacturer MNO services server 436 at 558, the mobile wireless device 102 can trigger download and installation of the identified eSIM 208 from an MNO provisioning server 116 at 566. When eSIM download and installation succeeds, at 568, the mobile wireless device 102 informs the device manufacturer device services server 434 of the successful installation of the eSIM (profile) 208 at 570. In some embodiments, the mobile wireless device 102 uses a check available options message to inform the device manufacturer device services server 434 of the successful eSIM installation. The device manufacturer device services server 434 sends a message to the device manufacturer MNO services server 436 of the successful installation of the eSIM 208 at 572, and, at 574, the device manufacturer MNO services server 436 sends a message to the MNO infrastructure server 438, e.g., a complete park order message, indicating the successful installation of the eSIM on the mobile wireless device 102. At 576, one or more MNO infrastructure servers 438 can cause service for the newly installed eSIM 208 to be activated for the mobile wireless device 102. In some embodiments, such as when a previous phone number or a corresponding service subscription is transferred from a previous mobile wireless device 102 to the mobile wireless device 102 as a result of the newly installed eSIM 208, a corresponding previous SIM card (UICC 118) or eSIM 208 of the previous mobile wireless device 102 can be deactivated at 578.

The park order message, sent at 414 in FIG. 4A, at 444/446 in FIG. 4B, at 514 in FIG. 5A, or at 544/546 in FIG. 5B, can include values in parameter fields that provide information regarding the sales order for the mobile wireless device 102 and/or for the eSIM(s) 208 reserved for the mobile wireless device 102. The park order message can include an eUICC identifier (EID) value for the eUICC 108 of the associated mobile wireless device 102 onto which one or more reserved eSIMs 208 can be installed. The park order message can also include an tether action value indicating whether eSIM download and installation occurs at a future time separated from the sales order process, e.g., a delayed tether action, or substantially commensurate with the sales order process, e.g., an immediate (now) tether action. The park order message can also include ICCID values for the eSIMs 208 to be subsequently downloaded and installed on the eUICC 108 of the mobile wireless device 102. The park order message can further include an indication, e.g., a Boolean value, that the sales order for the mobile wireless device 102 specifies one or more eSIMs 208 to be subsequently downloaded and installed. In some embodiments, cellular wireless service from a previous mobile wireless device 102 and associated user subscription account may be transferred to the mobile wireless device 102, and the park order message can include information about the transfer, e.g., i) an ICCID value for a source SIM/eSIM for which transfer of cellular wireless service to the mobile wireless device 102 is to occur, and/or ii) a phone number to be transferred. In some embodiments, the park order message includes an existing phone number or a new phone number (or multiples thereof) to be associated with the eSIMs 208 to be installed on the mobile wireless device 102. In some embodiments, the park order message includes information regarding an MNO associated with the eSIMs 208 to be installed, such as a public land mobile network (PLMN) value, and/or group identifier (GID) values, e.g., GID1, GID2.

The eSIM installation information, sent to the mobile wireless device 102 at 458 in FIG. 4B, or at 558 in FIG. 5B, can include values in parameter fields that provide information regarding the eSIMs 208 reserved for installation on the eUICC 108 of the mobile wireless device 102. The eSIM installation information can include an existing or new phone number (or multiples thereof) to be associated with the eSIMs 208 to be installed on the mobile wireless device 102. The eSIM installation information can include an EID value for the eUICC 108 of the mobile wireless device 102 and ICCID values for the new eSIMs 208 to be installed. When transferring wireless cellular service from a previous mobile wireless device 102, the eSIM installation information can also include ICCID values for previous SIMs/eSIMs for which cellular wireless service is to be transferred to the mobile wireless device 102. The eSIM installation information can also include information for MNOs 114 associated with the eSIMs 208 to be installed on the mobile wireless device 102, e.g., PLMN, GID1, and/or GID2 values.

Figure 6A:
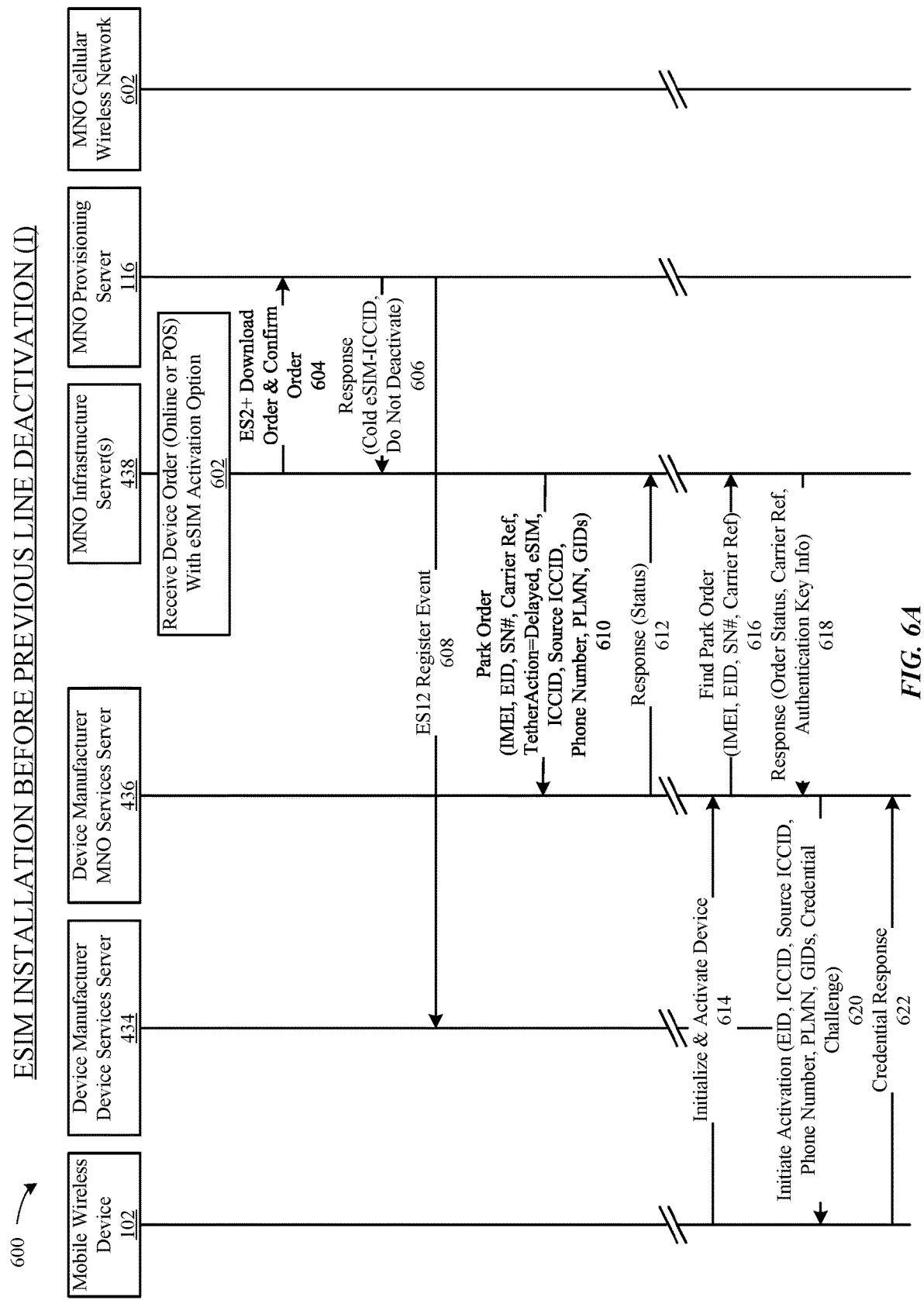
FIGS. 6A, 6B, and 6C illustrate an exemplary sequence of actions performed for installing and activating an eSIM on a mobile wireless device before deactivation of an associated, corresponding SIM or eSIM for a second mobile wireless device, according to some embodiments.
Figure 6B:
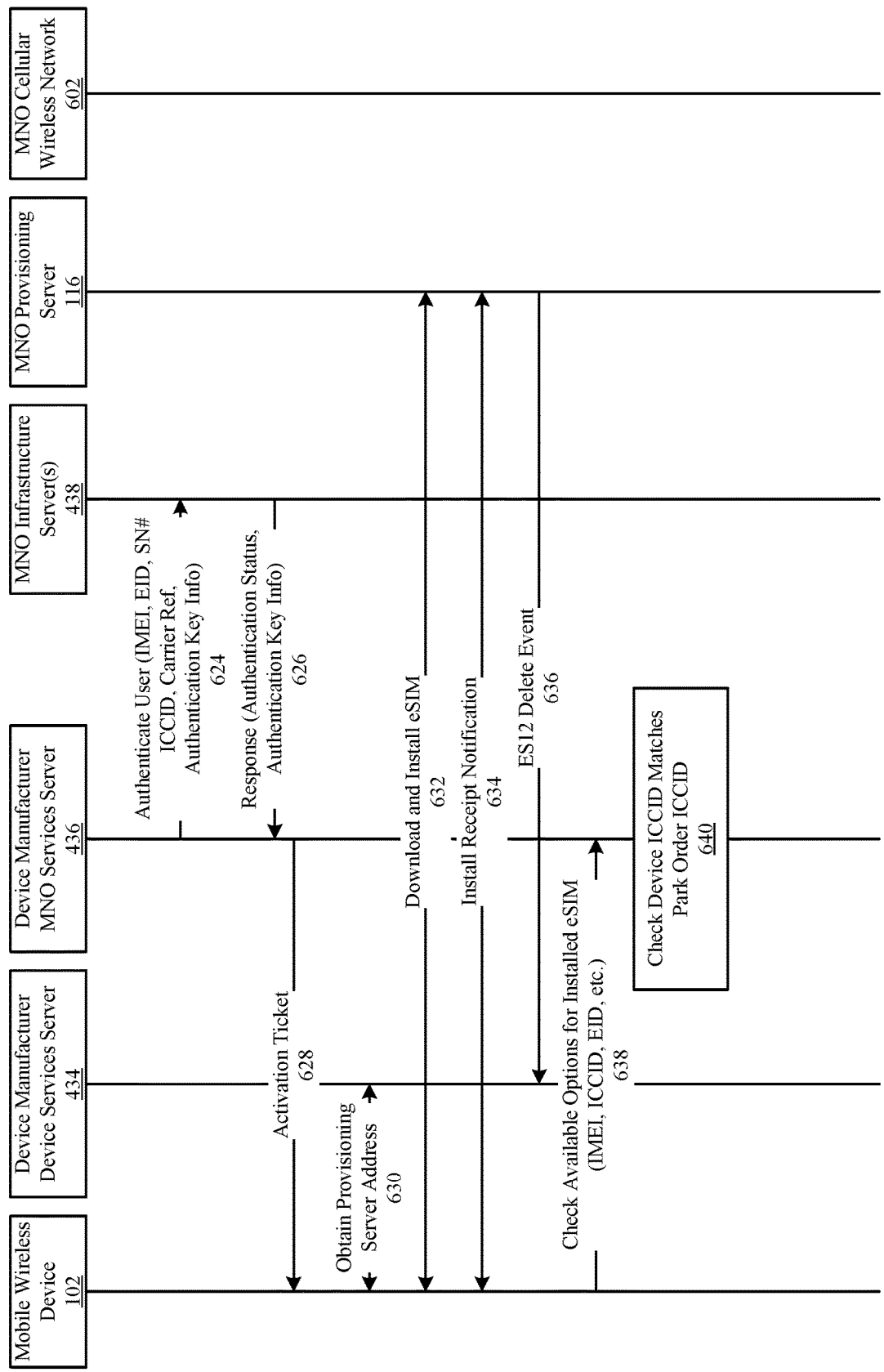
Figure 6C:
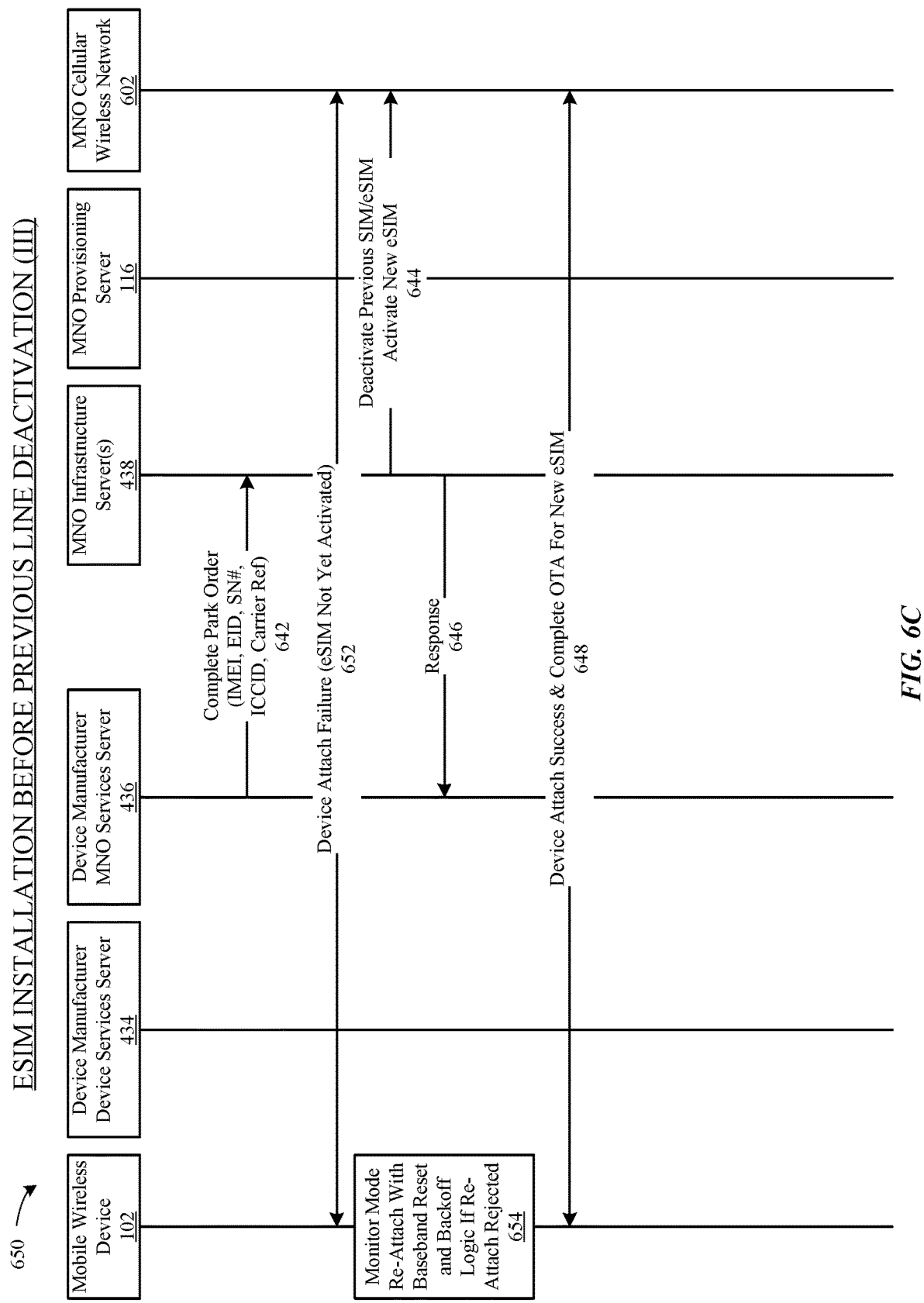

FIGS. 6A, 6B, and 6C illustrate diagrams 600, 630, 650 of an exemplary sequence of actions performed for installing and activating an eSIM 208 on a mobile wireless device 102 before deactivation of an associated, corresponding SIM or eSIM 208 for a second mobile wireless device 102. At 602, an MNO infrastructure server 438 receives a sales order for a mobile wireless device 102, which can occur online or at a point-of-sale retail store, where the sales order includes an indication that an eSIM 208 should be installed and activated on an eUICC 108 of the mobile wireless device 102. At 604, an MNO infrastructure server 438 sends an ES2+ download order and confirmation message to an MNO provisioning server 116 in response to receipt of a sales order for a mobile wireless device 102, the sales order including an indication of selection of an eSIM 208 for subsequent download, installation, and activation for the mobile wireless device 102. At 606, the MNO provisioning server 116 provides a response that includes i) an ICCID value for the eSIM 208 to be installed on the eUICC 108 of the mobile wireless device 102 and ii) an indication that a previous SIM/eSIM 208 is not to be deactivated yet. At 608, the MNO provisioning server 116 sends an ES12 register event message, triggered by the ES2+ download order and confirmation message, to a device manufacturer device services server 434, where the ES12 register event message includes an indication that there is an eSIM 208 (or multiple eSIMs 208) reserved for the mobile wireless device 102. The ES12 register event message can include identifiers for the mobile wireless device 102 and the eSIM(s) 208. At 610, the MNO infrastructure server 438 sends a park order message to a device manufacturer MNO services server 436, the park order message including information regarding a sales order for the mobile wireless device 102 and for one or more eSIMs 208 reserved for installation on the eUICC 108 of the mobile wireless device 102. Exemplary information in the park order message include a hardware identifier for the mobile wireless device 102, e.g., an international mobile equipment identifier (IMEI), a hardware identifier for the eUICC 108 of the mobile wireless device 102, e.g., an eUICC ID (EID) value, and a unique serial number (SN #) for the mobile wireless device 102. The park order message can also include an indication that download, installation, and activation of the one or more eSIMs 208 for the mobile wireless device 102 will occur at a future time (e.g., a delayed tethered action indication). The park order message can further include an indication whether an eSIM 208 is reserved for the mobile wireless device 102 (e.g., a Boolean value), an identifier for the eSIM 208, e.g., an ICCID value. The park order message can also include, when transferring cellular service for a previous SIM/eSIM 208 to the mobile wireless device 102, a previous SIM/eSIM identifier value, e.g., a source ICCID value, a phone number for transfer, and identifiers for an MNO 114 associated with the SIM/eSIM 208, e.g., PLMN, GID1, and/or GID2 values. At 612, the device manufacturer MNO services server 436 sends to the MNO infrastructure server a response message including status responsive to the park order message received. The actions at 602, 604, 606, 608, 610, and 612 can occur as part of a sales order process for purchase of the mobile wireless device 102 with reservation of an eSIM 208, where the sales order process can, in some embodiments, occur substantially separated in time from a subsequent device activation process that downloads, installs, and activates the eSIM 208 on the eUICC 108 of the mobile wireless device 102, e.g., as part of a device activation process. In some embodiments, the sales order process and device activation process (including download, installation, and activation of the eSIM 208) can occur substantially in the same time frame, e.g., as part of an in-person device purchase and device activation process at a retail outlet.

At 614, the mobile wireless device 102 can send a message to the device manufacturer MNO services server 436 to activate cellular services for the mobile wireless device 102. This message can occur as part of a device activation process for the mobile wireless device 102 initiated by a user (or a sales associate). At 616, the device manufacturer MNO services server 436 can send a find park order message to the MNO infrastructure server 438 to locate and confirm the previously indicated park order for the mobile wireless device 102. The find park order message can include information for locating the park order, such as hardware identifiers for the mobile wireless device 102, e.g., IMEI, EID, SN #, as well as a reference indicator of the MNO 114 (carrier). At 618, the device manufacturer MNO services server 436 can subsequently receive a response from the MNO infrastructure server 438 confirming an order status for the park order associated with the MNO 114 (carrier) and information usable for authentication of a user of the mobile wireless device 102. At 620, the device manufacturer MNO services server 436 can send an initiate activation message to the mobile wireless device 102, where the initiate activation message can include hardware and software identifiers associated with the park order, e.g., EID value, ICCID value, source ICCID value, phone number, PLMN, GID values, as well as a credential challenge for authentication of the user of the mobile wireless device 102 for installation of the eSIM 208 to the eUICC 108 of the mobile wireless device 102. At 622, the device manufacturer MNO services server 436 receives a credential response for authentication of the user to perform the eSIM 208 installation to the mobile wireless device 102. At 624, the device manufacturer MNO services server 436 sends an authenticate user message to an MNO infrastructure server 438 to authenticate the user of the mobile wireless device 102, the authenticate user message including identifiers for the mobile wireless device 102, e.g., IMEI, EID, SN #values, and identifiers for the eSIM 208 to be installed on the mobile wireless device 102, e.g., ICCID value, carrier reference, as well as authentication information obtained from the mobile wireless device 102. At 626, the MNO infrastructure server 438 provides an authentication response that indicates status of authentication of the user of the mobile wireless device 102. Upon successful user authentication, the device manufacturer MNO services server 436 sends, at 628, an activation ticket to the mobile wireless device 102 to initiate installation and activation of the eSIM 208 for the mobile wireless device 102. At 630, the mobile wireless device 102 obtains an address, e.g., a universal resource locator (URL) or equivalent, for the MNO provisioning server 116 from which to obtain the eSIM 208. At 632, the mobile wireless device 102 downloads from the MNO provisioning server 116 to the eUICC 108 of the mobile wireless device 102 one or more eSIMs 208 reserved for the mobile wireless device 102 previously. At 634, the mobile wireless device 102 provides an acknowledgment receipt indicating successful installation of the eSIM(s) 208 on the eUICC 108 of the mobile wireless device 102. At 636, the MNO provisioning server 116 sends an ES12 delete event message (the deleted event corresponding to the event previously registered at 608). At 638, the mobile wireless device 102 sends a message to the device manufacturer MNO services server to check for available options for the installed eSIM(s) 208, where the message includes one or more identifiers for the mobile wireless device 102, e.g., IMEI, EID, etc., and/or for the eSIM(s) 208, e.g., ICCID values. At 640, the device manufacturer MNO services server 436 determines whether an ICCID value for the eSIM 208 received from the mobile wireless device 102 at 638 matches to a corresponding ICCID value for the reserved eSIM 208 received in the park order message at 610. At 642, the device manufacturer MNO services server 436 sends a complete park order message to the MNO infrastructure server 438. The complete park order message includes identifiers for the mobile wireless device 102, e.g., IMEI, EID, SN #values, and for the eSIM 208, e.g., ICCID value and carrier reference. The complete park order message can trigger the MNO infrastructure servers 438 to transfer cellular wireless subscription service from a previous SIM/eSIM 208 of a second mobile wireless device 102. The activation of the new eSIM 208 and deactivation of the previous SIM/eSIM 208 can take multiple seconds or minutes to propagate through all of the MNO infrastructure servers 438 involved. Before completion of eSIM activation, the mobile wireless device 102 can attempt, at 652, to attach to an access portion of an MNO cellular wireless network 602 using credentials from the installed eSIM 208. As the new eSIM activation may not have completed when the mobile wireless device 102 attempts to attach, the MNO cellular wireless network 602 can reject the attachment with a failure message. Responsive to receipt of an attachment failure message from the MNO cellular wireless network 602, the mobile wireless device 102 can enter a monitor mode and attempt to re-attach to the MNO cellular wireless network 602 after a back-off time. In some embodiments, the eSIM 208 can be disabled and re-enabled to start another attachment attempt to the MNO cellular wireless network 602. In some embodiments, wireless circuitry 110, e.g., baseband components, can be reset as part of the monitor mode. At 644, the MNO infrastructure server(s) 438 complete activation of the new eSIM 208 and deactivation of the previous SIM/eSIM 208 propagating the activation through applicable entities of the MNO cellular wireless network 602. After completion of the eSIM 208 activation, the MNO infrastructure server 438 provides a response to the device manufacturer MNO services server 436 to indicate cellular wireless service subscription for the eSIM 208 has been successfully completed. At 648, the mobile wireless device successfully attaches to the MNO cellular wireless network 602, and in some embodiments performs an over-the-air (OTA) update for the newly installed eSIM 208.

Figure 6D:
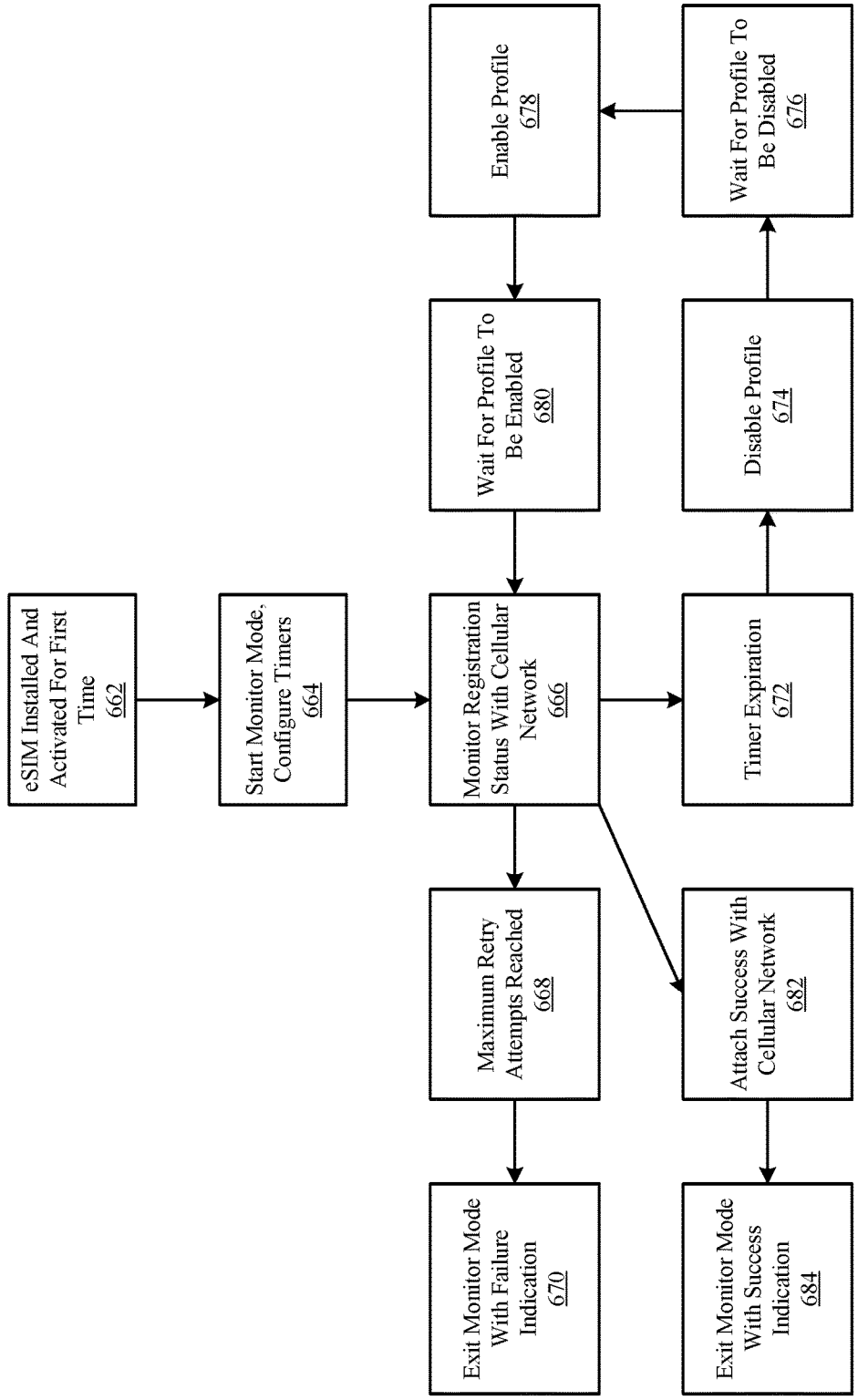
FIG. 6D illustrates an exemplary monitor mode state machine for initial activation of an eSIM for a mobile wireless device, according to some embodiments.

FIG. 6D illustrates a diagram 660 of an exemplary monitor mode state machine for initial activation of an eSIM 208 for a mobile wireless device 102. At 662, an eSIM 208 is installed and activated for a first time on a mobile wireless device 102. At 664, the mobile wireless device 102 initiates the monitor mode state machine and configures one or more timers. At 666, the mobile wireless device 102 monitors registration status for the mobile wireless device 102 to determine whether the mobile wireless device 102 has successfully attached to an MNO cellular wireless network 602 associated with the newly installed eSIM 208. Activation of the eSIM 208 in all applicable servers of an infrastructure network of the MNO 114 may require some time to complete, and as such attachment to an access portion of the MNO cellular wireless network 602 cannot be guaranteed to succeed immediately after completion of installation of the eSIM 208 at the mobile wireless device 102. At 666, the mobile wireless device 102 can attempt to attach to an access portion of the MNO cellular wireless network 602. Successful attachment to the MNO cellular wireless network 602, indicated at 682, causes the mobile wireless device 102 to exit the monitor mode with an attachment success indication at 694. Attachment failure at 666 causes the mobile wireless device 102 to remain in a monitor mode and upon expiration of a timer at 672, the mobile wireless device 102 disables the eSIM (profile) 208 at 674, waits for disablement of the eSIM (profile) 208 to complete at 676, subsequently re-enables the eSIM (profile) 208 at 768, and then waits for enablement of the eSIM (profile) 208 to complete at 680 before re-attempting attachment of the mobile wireless device 102 to the MNO cellular wireless network 602 again at 666. When the mobile wireless device 102 has re-attempted attachment to the MNO cellular wireless network multiple times, and a maximum number of retry attempts is reached at 668, the mobile wireless device 102 exits monitor mode with a failure indication. In some embodiments, the mobile wireless device 102 provides an indication of attachment success and/or attachment failure, such as via a display of the mobile wireless device 102.

The monitor mode state machine illustrated in FIG. 6D can compensate for propagation delay between when an eSIM 208 completes installation on a mobile wireless device 102 and when the MNO cellular wireless network 602 completes activation of the newly installed eSIM 208 (and deactivation of a previous eSIM 208 if applicable). The device manufacturer MNO services server 436, at 642 in FIG. 6C, indicates to the MNO infrastructure server 438 that the eSIM installation is complete (and therefore the mobile wireless device 102 can assume that the eSIM 208 is ready for use); however, propagation of the eSIM installation completion throughout the MNO cellular wireless network 602 can take some matter of tens of seconds or up to several minutes depending on network loading. Attempting to attach to an access portion of the MNO cellular wireless network 602 by the mobile wireless device 102 before propagation of the eSIM activation completes can result in a non-access stratum (NAS) signaling message indicating a fatal rejection cause. As specifications for NAS signaling published by the $3^{rd}$ Generation Partnership Project (3GPP) can disallow re-attachment by a mobile wireless device 102 to the MNO cellular wireless network 602 using the same credentials from the eSIM 208 unless the mobile wireless device 102 is rebooted (or in the case of a physical SIM card, after the SIM card is removed and re-inserted into the mobile wireless device 102). Reboot of the mobile wireless device 102, however, cannot occur in the midst of a device activation process as described herein. Similar to SIM re-insertion, the mobile wireless device 102 can disable and then subsequently re-enable the eSIM 208, repeating as needed with back-off timers to delay each attempt until successful attachment occurs or a maximum number of retries is reached.

Figure 7A:
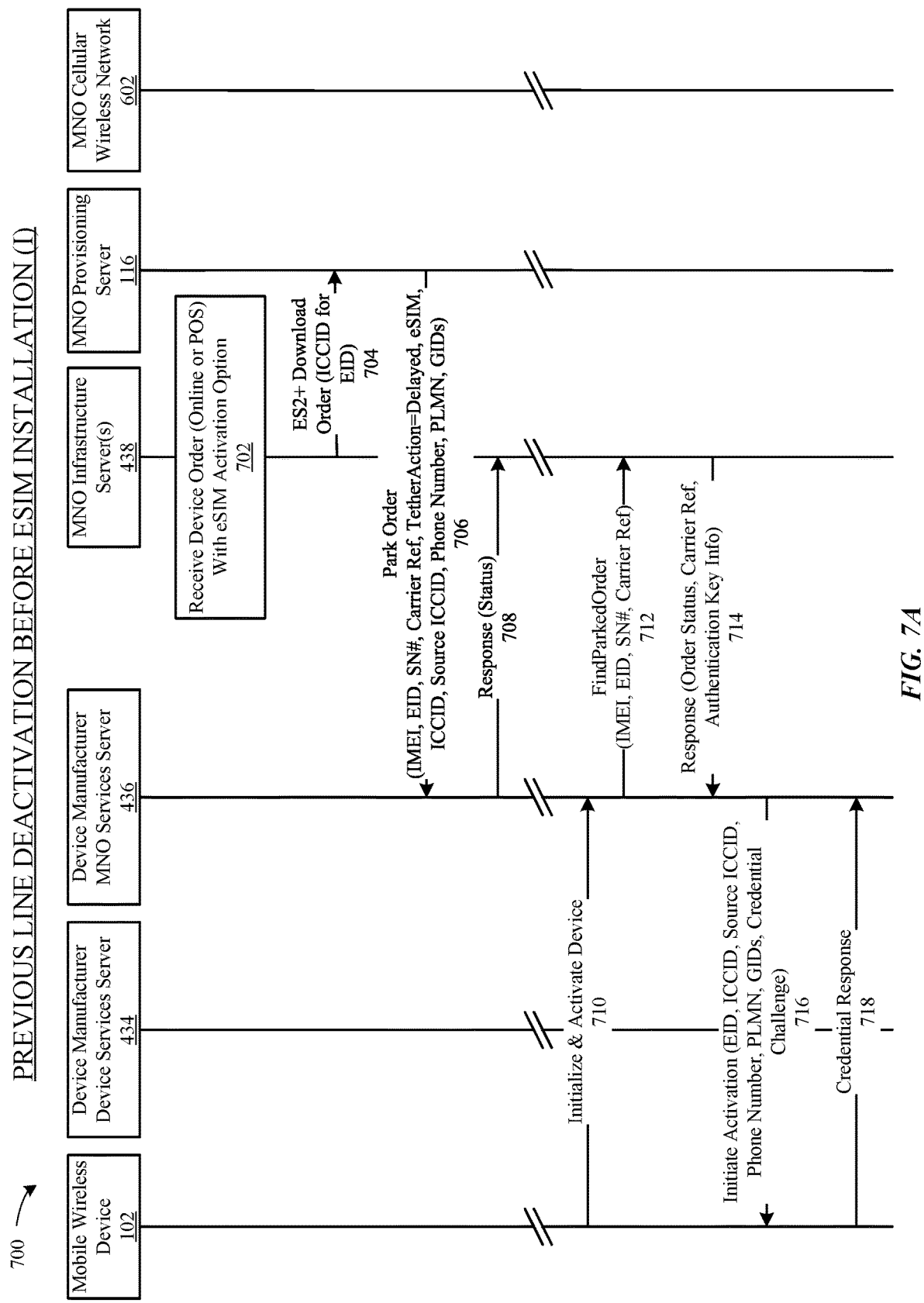
FIGS. 7A and 7B illustrate an exemplary sequence of actions performed for installing and activating an eSIM to a mobile wireless device after deactivation of an associated, corresponding SIM or eSIM for a second mobile wireless device, according to some embodiments.
Figure 7B:
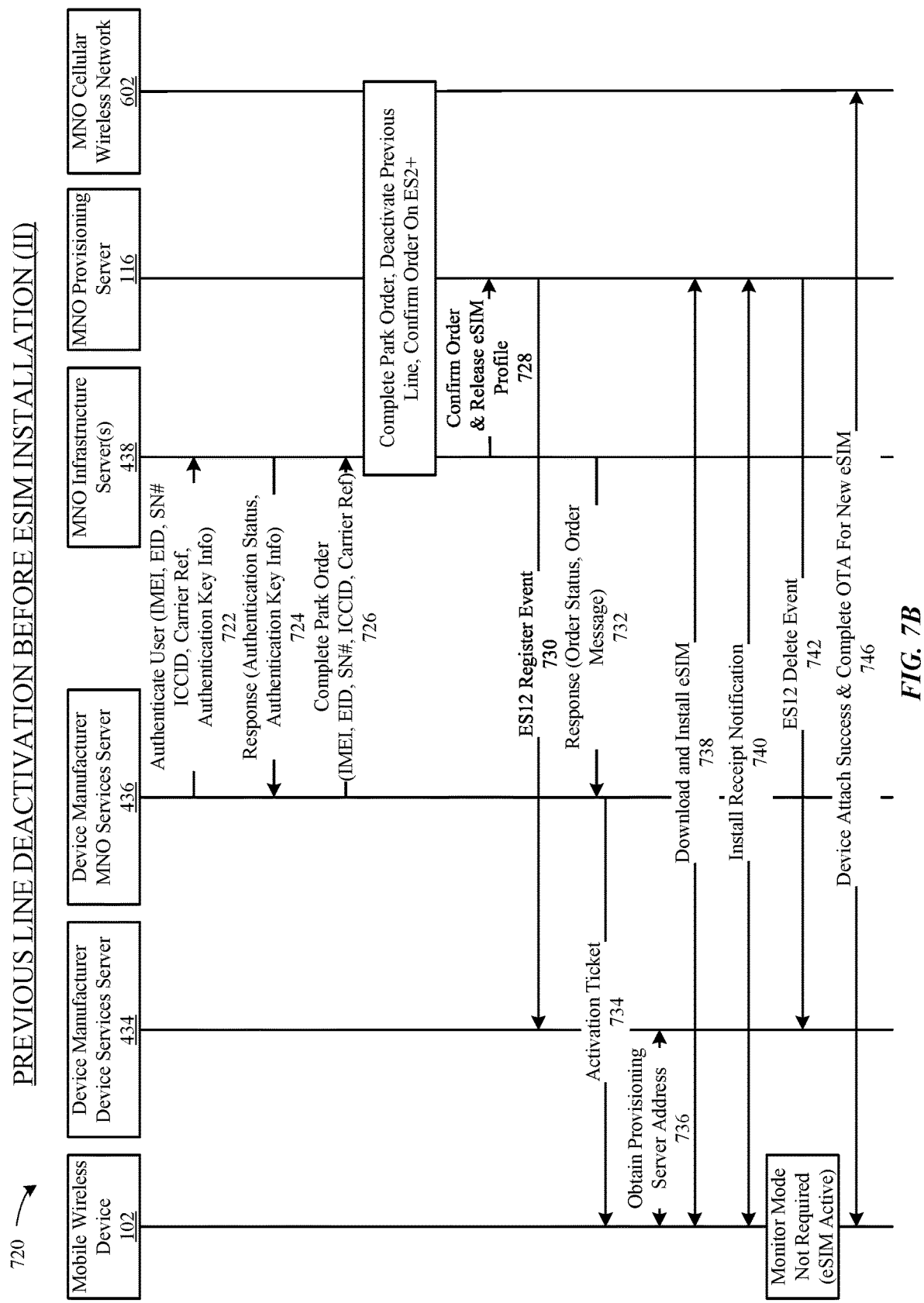

FIGS. 7A and 7B illustrate diagrams 700, 720 of an exemplary sequence of actions performed for installing and activating an eSIM 208 to a mobile wireless device 102 after deactivation of an associated, corresponding SIM or eSIM 208 for a second mobile wireless device 102. At 702, an MNO infrastructure server 438 receives a sales order for a mobile wireless device 102, which can occur online or at a point-of-sale retail store, where the sales order includes an indication that an eSIM 208 should be installed and activated on an eUICC 108 of the mobile wireless device 102. At 704, an MNO infrastructure server 438 sends an ES2+ download order message to an MNO provisioning server 116 in response to receipt of a sales order for a mobile wireless device 102, the sales order including an indication of selection of an eSIM 208 for subsequent download, installation, and activation for the mobile wireless device 102. In some embodiments, the download order includes an EID for the eUICC 108 of the mobile wireless device on which the eSIM 208 will be loaded. At 706, the MNO infrastructure server 438 sends a park order message to a device manufacturer MNO services server 436, the park order message including information regarding a sales order for the mobile wireless device 102 and for one or more eSIMs 208 reserved for installation on the eUICC 108 of the mobile wireless device 102. Exemplary information in the park order message include a hardware identifier for the mobile wireless device 102, e.g., an international mobile equipment identifier (IMEI), a hardware identifier for the eUICC 108 of the mobile wireless device 102, e.g., an EID, and a unique serial number (SN) for the mobile wireless device 102. The park order message can also include an indication that download, installation, and activation of the one or more eSIMs 208 for the mobile wireless device 102 will occur at a future time (e.g., a delayed tethered action indication). The park order message can further include an indication whether an eSIM 208 is reserved for the mobile wireless device 102 (e.g., a Boolean value), an identifier for the eSIM 208, e.g., an ICCID value. The park order message can also include, when transferring cellular service for a previous SIM/eSIM 208 to the mobile wireless device 102, a previous SIM/eSIM identifier value, e.g., a source ICCID value, a phone number for transfer, and identifiers for an MNO 114 associated with the SIM/eSIM 208, e.g., PLMN, GID1, and/or GID2 values. At 708, the device manufacturer MNO services server 436 sends to the MNO infrastructure server a response message including status responsive to the park order message received. The actions at 702, 704, 706, and 708 can occur as part of a sales order process for purchase of the mobile wireless device 102 with reservation of an eSIM 208, where the sales order process can, in some embodiments, occur substantially separated in time from a subsequent device activation process that downloads, installs, and activates the eSIM 208 on the eUICC 108 of the mobile wireless device 102, e.g., as part of a device activation process. In some embodiments, the sales order process and device activation process (including download, installation, and activation of the eSIM 208) can occur substantially in the same time frame, e.g., as part of an in-person device purchase and device activation process at a retail outlet.

At 710, the mobile wireless device 102 can send a message to the device manufacturer MNO services server 436 to activate cellular services for the mobile wireless device 102. This message can occur as part of a device activation process for the mobile wireless device 102 initiated by a user (or a sales associate). At 712, the device manufacturer MNO services server 436 can send a find park order message to the MNO infrastructure server 438 to locate and confirm the previously indicated park order for the mobile wireless device 102. The find park order message can include information for locating the park order, such as hardware identifiers for the mobile wireless device 102, e.g., IMEI, EID, SN #, as well as a reference indicator of the MNO 114 (carrier). At 714, the device manufacturer MNO services server 436 can subsequently receive a response from the MNO infrastructure server 438 confirming an order status for the park order associated with the MNO 114 (carrier) and information usable for authentication of a user of the mobile wireless device 102. At 716, the device manufacturer MNO services server 436 can send an initiate activation message to the mobile wireless device 102, where the initiate activation message can include hardware and software identifiers associated with the park order, e.g., EID value, ICCID value, source ICCID value, phone number, PLMN, GID values, as well as a credential challenge for authentication of the user of the mobile wireless device 102 for installation of the eSIM 208 to the eUICC 108 of the mobile wireless device 102. At 718, the device manufacturer MNO services server 436 receives a credential response for authentication of the user to perform the eSIM 208 installation to the mobile wireless device 102. At 722, the device manufacturer MNO services server 436 sends an authenticate user message to an MNO infrastructure server 438 to authenticate the user of the mobile wireless device 102, the authenticate user message including identifiers for the mobile wireless device 102, e.g., IMEI, EID, SN #values, and identifiers for the eSIM 208 to be installed on the mobile wireless device 102, e.g., ICCID value, carrier reference, as well as authentication information obtained from the mobile wireless device 102. At 724, the MNO infrastructure server 438 provides an authentication response that indicates status of authentication of the user of the mobile wireless device 102. At 726, the device manufacturer MNO services server 436 sends a complete park order message to the MNO infrastructure server 438. The complete park order message includes identifiers for the mobile wireless device 102, e.g., IMEI, EID, SN #values, and for the eSIM 208, e.g., ICCID value and carrier reference. The complete park order message can trigger the MNO infrastructure servers 438 to transfer cellular wireless subscription service from a previous SIM/eSIM 208 of a second mobile wireless device 102. At 728, the MNO infrastructure server 438 can send a confirm order message and request the MNO provisioning server 116 release the reserved eSIM 208 for the mobile wireless device 102. As a result of the complete park order message at 726 and subsequent confirm order at 728, deactivation of a previous SIM/eSIM 208 associated with a second mobile wireless device 102 can occur before installation and activation of the new eSIM 208 on the mobile wireless device 102 occurs.

At 730, the MNO provisioning server 116 sends an ES12 register event message, triggered by the ES2+ download order and confirmation message, to a device manufacturer device services server 434, where the ES12 register event message includes an indication that there is an eSIM 208 (or multiple eSIMs 208) reserved for the mobile wireless device 102. The ES12 register event message can include identifiers for the mobile wireless device 102 and the eSIM(s) 208. At 732, the device manufacturer MNO services server 436 can subsequently receive a response from the MNO infrastructure server 438 confirming an order status for the park order associated with the MNO 114 (carrier). At 734, the device manufacturer MNO services server 436 sends an activation ticket to the mobile wireless device 102 to initiate installation and activation of the eSIM 208 for the mobile wireless device 102. At 736, the mobile wireless device 102 obtains an address, e.g., a universal resource locator (URL) or equivalent, for the MNO provisioning server 116 from which to obtain the eSIM 208. At 738, the mobile wireless device 102 downloads from the MNO provisioning server 116 to the eUICC 108 of the mobile wireless device 102 one or more eSIMs 208 reserved for the mobile wireless device 102 previously. At 740, the mobile wireless device 102 provides an acknowledgment receipt indicating successful installation of the eSIM(s) 208 on the eUICC 108 of the mobile wireless device 102. At 742, the MNO provisioning server 116 sends an ES12 delete event message (the deleted event corresponding to the event previously registered at 608). As the eSIM 208 has previously been released (at 728), propagation of the eSIM information to other MNO servers has already occurred (the eSIM 208 is implicitly active after the confirmation order and ready for use upon installation at the mobile wireless device 102). Thus, a monitor mode is not required for the scenario in which previous line deactivation occurs before installation and activation of an eSIM. At 746, the mobile wireless device 102 attempts and succeeds in attaching to an access network portion of an MNO cellular wireless network 602. After attachment, if required, an over-the-air (OTA) update for the newly installed eSIM 208 can occur.

Figure 8:
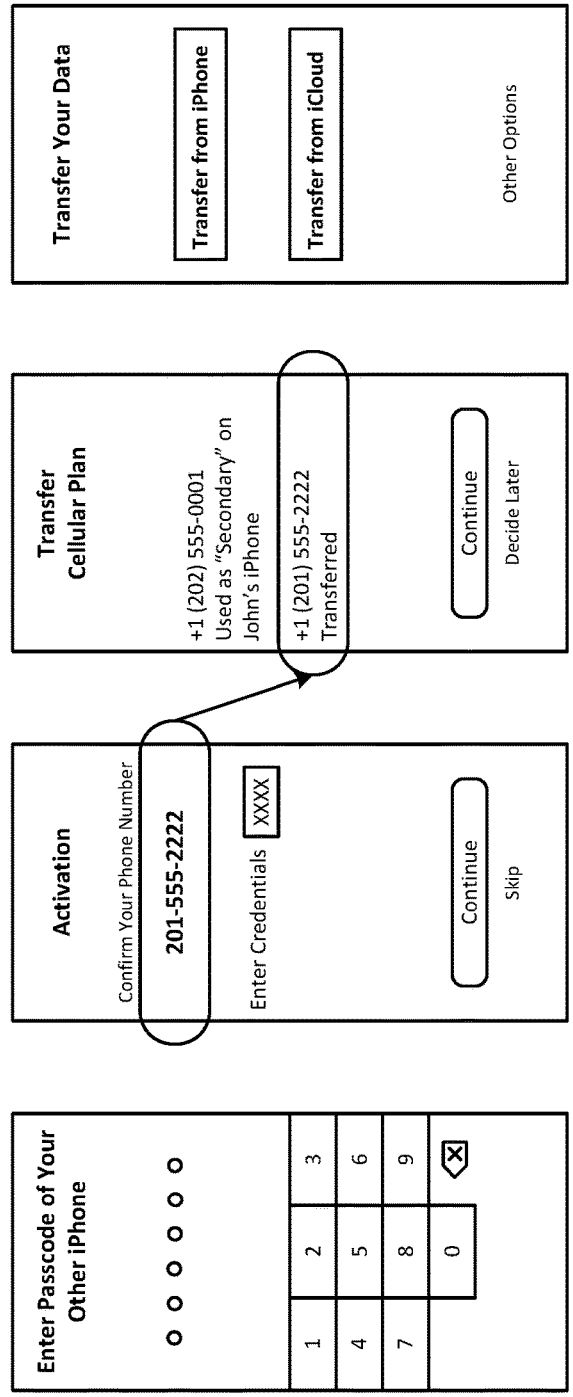
FIG. 8 illustrates a set of exemplary display screens for on-device activation of an eSIM during device activation of a mobile wireless device, according to some embodiments.

FIG. 8 illustrates a diagram 800 of an exemplary set of information screens that can be provided via a display of the mobile wireless device 102 as part of an on-device activation of an eSIM 208 during a device activation process for the mobile wireless device 102. Additional information screens (not shown) can occur before, after, and/or between the individual information screens shown in FIG. 8. A user that transfers cellular wireless service for an eSIM 208 from a second mobile wireless device 102 can be prompted to enter a passcode for that second mobile wireless device 102. An activation screen can confirm the phone number to be transferred and request the user enter authentication credentials to indicate authorization to transfer the phone number to the mobile wireless device 102. Additional wireless cellular plans for other SIMs/eSIMs can also be transferred separately in the transfer cellular plan information screen. The previously transferred phone number (from the activation information screen) can be indicated as already transferred on the transfer cellular plan information screen. Following transfer of one or more cellular wireless plans, a user can be presented with options for transferring additional data from the second mobile wireless device 102 or from an associated cloud-based service account, as indicated by the transfer your data information screen.

Figure 9:
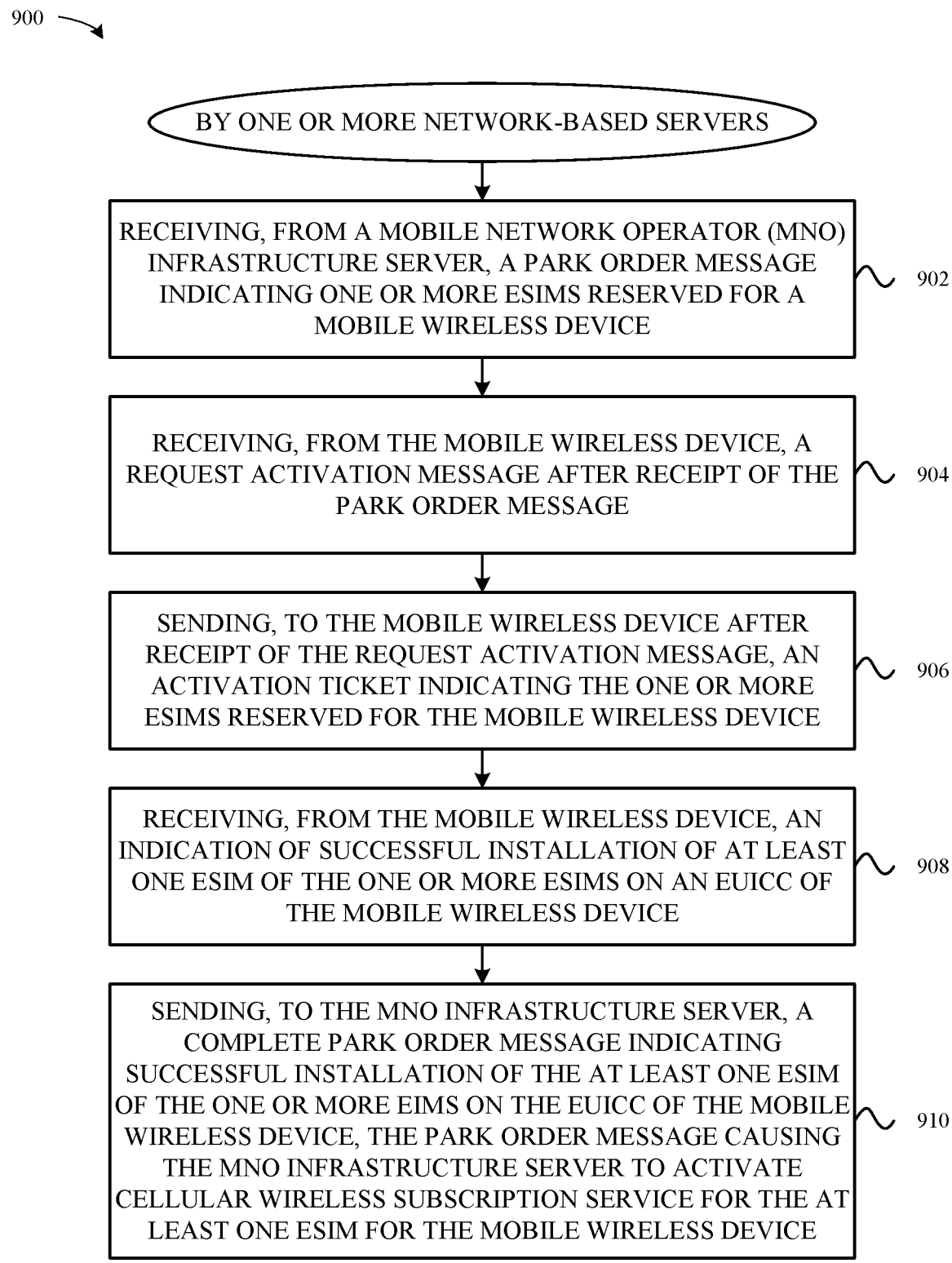
FIG. 9 illustrates a flowchart of an exemplary method performed by one or more network-based servers to provision and activate an eSIM for a mobile wireless device, according to some embodiments.

FIG. 9 illustrates a diagram 900 of a flowchart for an exemplary method performed by one or more network-based servers 434, 436 to provision and activate an eSIM 208 for a mobile wireless device 102. At 902, the one or more network-based servers 434, 436 receive from an MNO infrastructure server 438 a park order message indicating one or more eSIMs 208 reserved for the mobile wireless device 102. At 904, the one or more network-based servers 434, 436 receive from the mobile wireless device 102 a request activation message to activate the mobile wireless device 102, where the request activation message occurs after receipt of the park order message. At 906, the one or more network-based servers 434, 436 send to the mobile wireless device 102, after receipt of the request activation message, an activation ticket indicating the one or more eSIMs 208 reserved for the mobile wireless device 102. At 908, the one or more network-based servers 434, 436 receive from the mobile wireless device 102 an indication of successful installation of at least one eSIM 208 of the one or more eSIMs 208 on an eUICC 108 of the mobile wireless device 102. At 920, the one or more network-based servers 434, 436 send to the MNO infrastructure server 438 a complete park order message indicating successful installation of the at least one eSIM 208 of the one or more eSIMs 208 on the eUICC 108 of the mobile wireless device 102, where the park order message causes the MNO infrastructure server 438 to activate cellular wireless subscription service for the at least one eSIM 208 for the mobile wireless device 102.

In some embodiments, the one or more network-based servers 434, 436 send to the mobile wireless device 102, in response to receipt of the request activation message, a credential challenge to authenticate a user of the mobile wireless device 102, and subsequently send to the mobile wireless device 102 the activation ticket only after successful authentication of the user of the mobile wireless device 102. In some embodiments, the one or more network-based servers 434, 436 receive, from an MNO provisioning server 116, a registration event message before receipt of the park order message from the MNO infrastructure server 438, and subsequently the one or more network-based servers 434, 436 correlate information included in the registration event message from the MNO provisioning server 116 with corresponding information included in the park order message from the MNO infrastructure server 438. In some embodiments, correlating the registration event message comprises comparing an identifier for an eSIM 208 of the one or more eSIMs 208 reserved for the mobile wireless device 102 included in the registration event message to a corresponding identifier for the eSIM 208 included in the park order message. In some embodiments, the one or more network-based servers 434, 436 receive from the MNO provisioning server 116 a delete event message corresponding to the registration event message after successful installation of the at least one eSIM 208 of the one or more eSIMs 208 on the eUICC 108 of the mobile wireless device 102. In some embodiments, the one or more network-based servers 434, 436 provide to the mobile wireless device 102 after ending the activation ticket a network address of the MNO provisioning server 116 from which to download the one or more eSIMs 208. In some embodiments, the one or more network-based servers 434, 436 validate whether one or more eSIM identifiers received from the mobile wireless device 102, after successful installation of the at least one eSIM 208 of the one or more eSIMs 208, match corresponding eSIM identifiers included in the park order message from the MNO infrastructure server 438, and subsequently send the park order complete message to the MNO infrastructure server 438 only upon successful validation indicating that the eSIM identifiers match. In some embodiments, the park order message includes a delayed tether action indication for the one or more eSIMs 208, where at least one eSIM 208 of the one or more eSIMs 208 can be activated at a future time. In some embodiments, the MNO infrastructure server 438, responsive to the complete park order message, deactivates subscription service for at least one eSIM 208 of a second mobile wireless device 102 corresponding to the at least one eSIM 208 activated for the mobile wireless device 102. In some embodiments, the park order message received from the MNO infrastructure server 438 includes integrated circuit card identifiers (ICCIDs) for the at least one eSIM 208 of the second mobile wireless device 102 and ICCIDs for the one or more eSIMs 208 reserved for the mobile wireless device 102. In some embodiment, the one or more network-based servers 434, 436 include a device manufacturer device services server 434 for communicating with mobile wireless devices 102 and a device manufacturer MNO services server 436 for communicating with one or more MNO servers 438, 116.

Figure 10A:
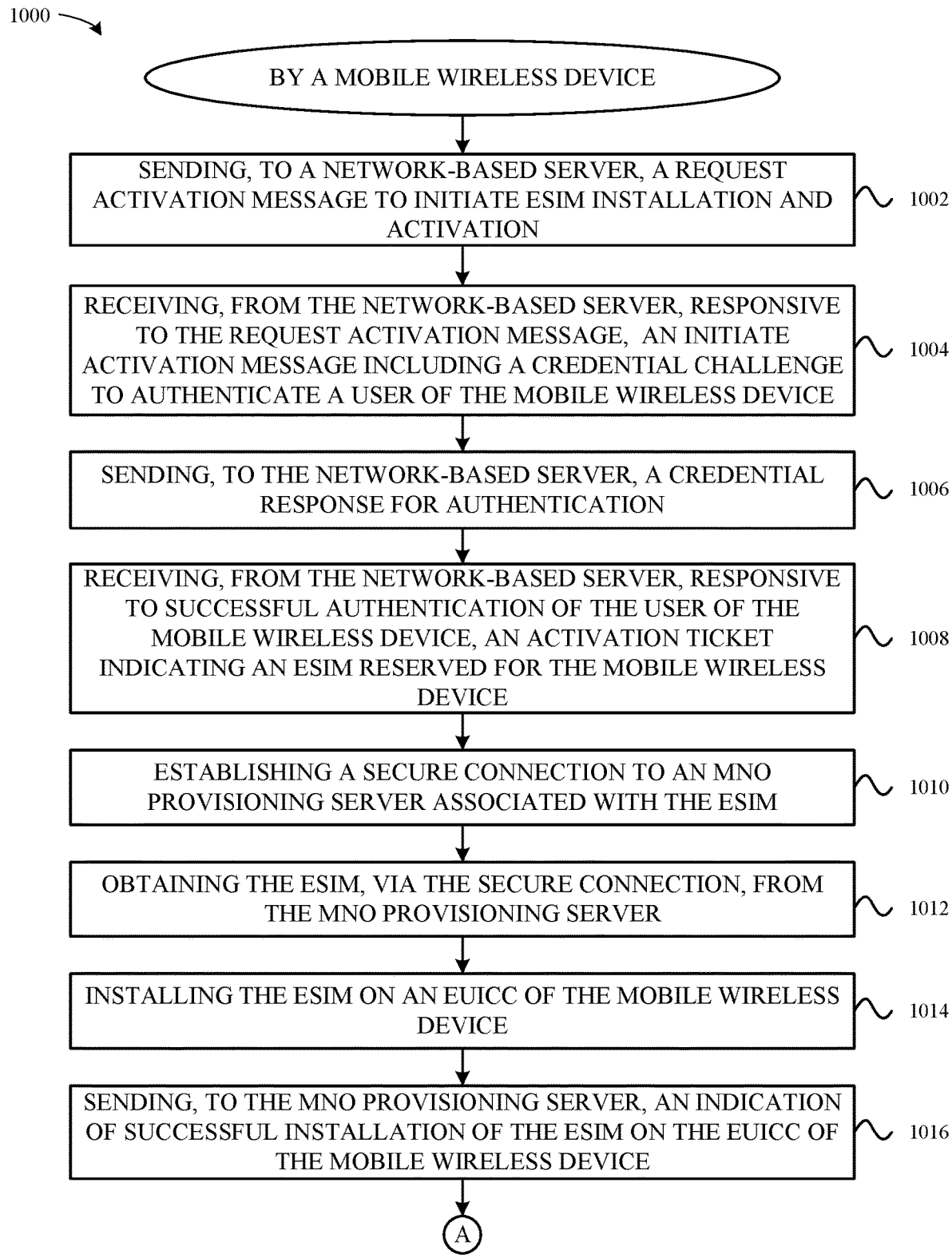
FIGS. 10A and 10B illustrate a flowchart of an exemplary method performed by a mobile wireless device to provision and activate an eSIM to the mobile wireless device, according to some embodiments.
Figure 10B:
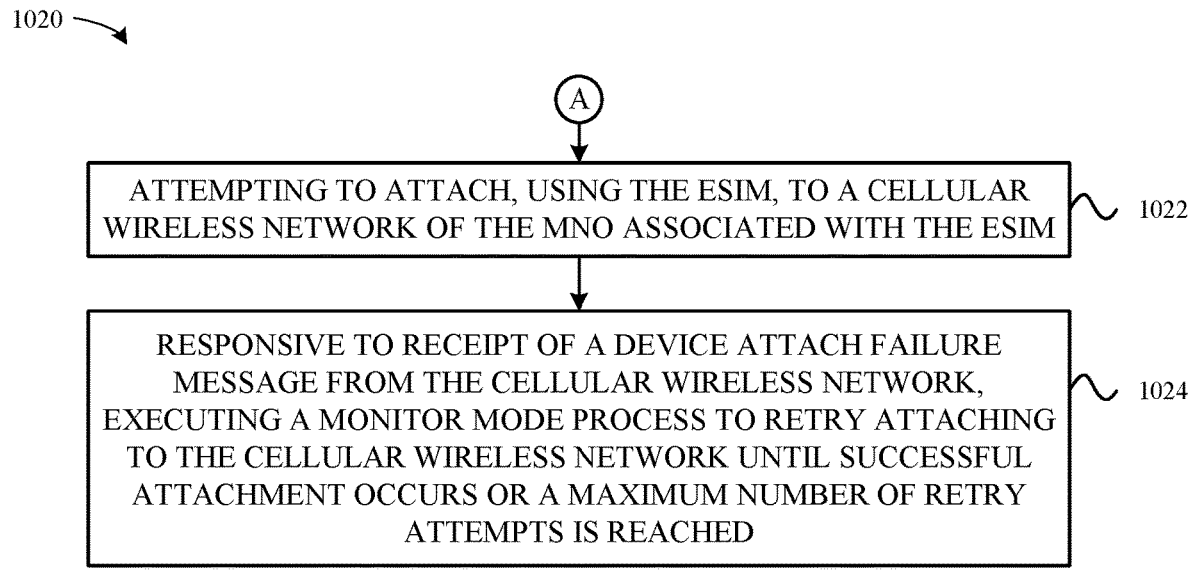

FIGS. 10A and 10B illustrate diagrams 1000, 1020 of a flowchart for an exemplary method performed by a mobile wireless device 102 to provision and activate an eSIM 208 to the mobile wireless device 102. At 1002, the mobile wireless device 102 sends to a network-based server 434 a request activation message to initiate activation of the mobile wireless device 102 including initiating eSIM installation and activation for the mobile wireless device 102. At 1004, the mobile wireless device 102 receives from the network-based server 434 an initiate activation message including a credential challenge to authenticate a user of the mobile wireless device 102. At 1006, the mobile wireless device 102 sends to the network-based server 434 a credential response for authentication of the user of the mobile wireless device 102. At 1008, the mobile wireless device 102 receives from the network-based server 434, responsive to successful authentication of the user of the mobile wireless device 102, an activation ticket indicating an eSIM 208 reserved for the mobile wireless device 102. At 1010, the mobile wireless device 102 establishes a secure connection to an MNO provisioning server 116 associated with the eSIM 208 reserved for the mobile wireless device 102. At 1012, the mobile wireless device 102 obtains from the MNO provisioning server 116 via the secure connection the eSIM 208 reserved for the mobile wireless device 102. At 1014, the mobile wireless device 102 installs the eSIM 208 on the eUICC 108 of the mobile wireless device 102. At 1016, the mobile wireless device 102 sends to the MNO provisioning server 116 an indication of successful installation of the eSIM 208 on the eUICC 108 of the mobile wireless device 102. At 1022, the mobile wireless device 102 attempts to attach to an MNO cellular wireless network 602 associated with the eSIM 208. At 1024, responsive to receipt of a device attach failure message from the MNO cellular wireless network 602, the mobile wireless device 102 executes a monitor mode process to retry attaching to the MNO cellular wireless network 602 until successful attachment occurs or a maximum number of retry attempts is reached.

In some embodiments, the mobile wireless device 102: i) configures a time for the monitor mode process, ii) monitors for successful attachment to the MNO cellular wireless network 602 by attempting to attach to the MNO cellular wireless network 602 and observing corresponding responses received, and iii) while no successful attachment occurs and before the maximum number of retry attempts is reached, after expiration of the timer, disabling and re-enabling the eSIM 208 before continuing to monitor for successful attachment to the MNO cellular wireless network 602. In some embodiments, the initiate activation message includes an integrated circuit card identifier (ICCID) for the eSIM 208, where the eSIM 208 was previously reserved for the mobile wireless device 102 based on a sales order for the mobile wireless device 102. In some embodiments, the initiate activation message further includes an eUICC identifier (EID) for the eUICC 108 of the mobile wireless device 102 on which the previously reserved eSIM 208 is to be provisioned. In some embodiments, the mobile wireless device 102: i) receives, from a second network-based server 436 responsive to a query, a message including an indication of one or more pending eSIMs 208 reserved for the mobile wireless device 102, ii) compares the ICCID for the eSIM 208 included in the initiate activation message received from the second network-based server 436 to corresponding ICCIDs for the one or more pending eSIMs 208 reserved for the mobile wireless device 102, and iii) triggers download and installation of the eSIM 208 from the MNO provisioning server 116 when the ICCID for the eSIM 208 matches an ICCID of the corresponding ICCIDs. In some embodiments, the initiate activation message includes an ICCID for an eSIM 208 of a second mobile wireless device 102 from which subscription for the eSIM 208 is to be transferred to the mobile wireless device 102. In some embodiments, the mobile wireless device 102 obtains, from the network-based server 434, a network address for the MNO provisioning server 116 after receipt of the activation ticket.

Figure 11:
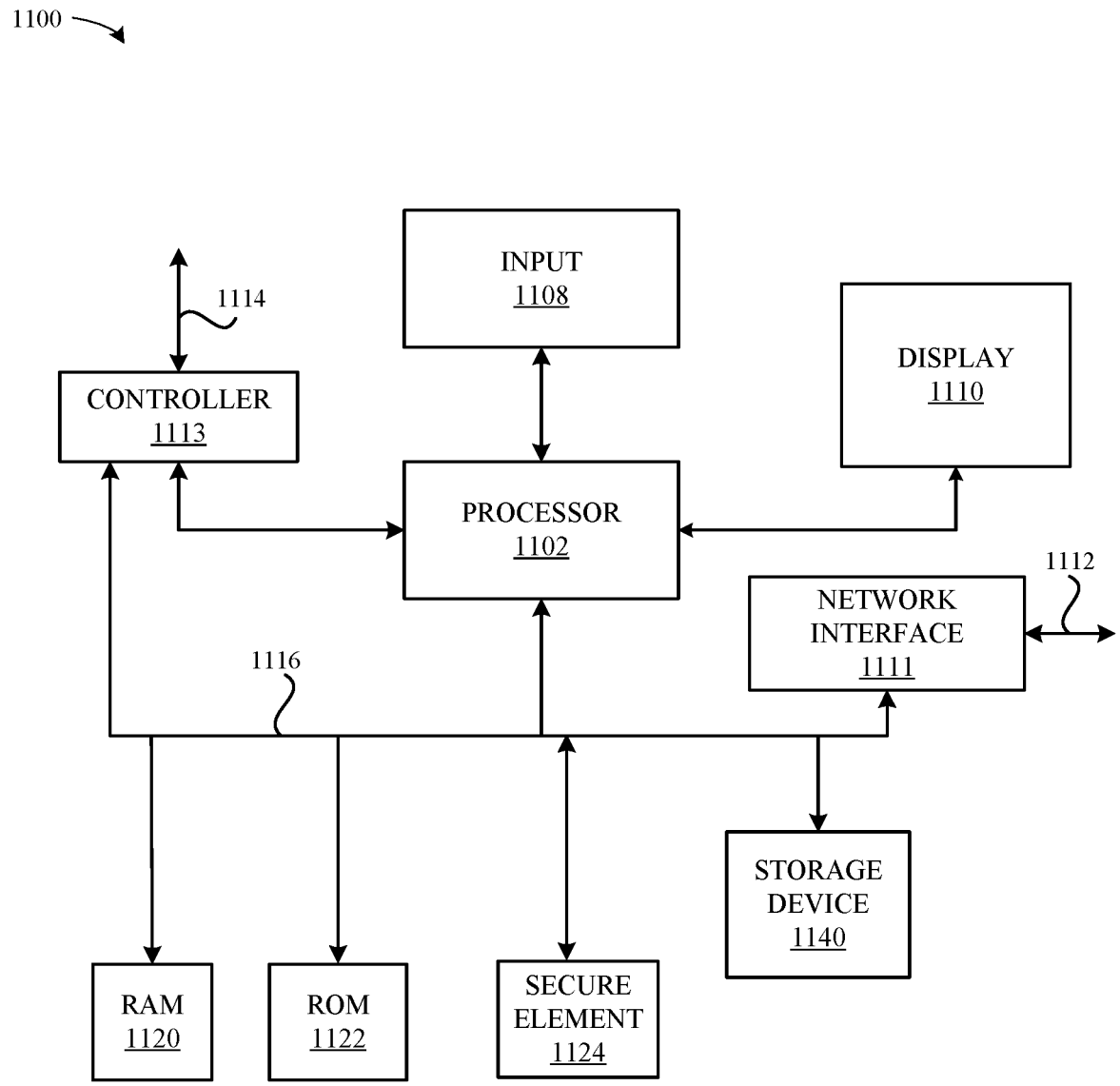
FIG. 11 illustrates a block diagram of exemplary elements of a mobile wireless device, according to some embodiments.

FIG. 11 illustrates a detailed view of a representative computing device 1100 that can be used to implement various methods described herein, according to some embodiments. In particular, the detailed view illustrates various components that can be included in the mobile wireless device 102. As shown in FIG. 11, the computing device 1100 can include a processor 1102 that represents a microprocessor or controller for controlling the overall operation of computing device 1100. The computing device 1100 can also include a user input device 1108 that allows a user of the computing device 1100 to interact with the computing device 1100. For example, the user input device 1108 can take a variety of forms, such as a button, keypad, dial, touch screen, audio input interface, visual/image capture input interface, input in the form of sensor data, etc. Still further, the computing device 1100 can include a display 1110 that can be controlled by the processor 1102 to display information to the user. A data bus 1116 can facilitate data transfer between at least a storage device 1140, the processor 1102, and a controller 1113. The controller 1113 can be used to interface with and control different equipment through an equipment control bus 1114. The computing device 1100 can also include a network/bus interface 1111 that communicatively couples to a data link 1112. In the case of a wireless connection, the network/bus interface 1111 can include a wireless transceiver.

The computing device 1100 also includes a storage device 1140, which can comprise a single disk or a plurality of disks (e.g., hard drives), and includes a storage management module that manages one or more partitions within the storage device 1140. In some embodiments, storage device 1140 can include flash memory, semiconductor (solid state) memory or the like. The computing device 1100 can also include a Random Access Memory (RAM) 1120 and a Read-Only Memory (ROM) 1122. The ROM 1122 can store programs, utilities or processes to be executed in a non-volatile manner. The RAM 1120 can provide volatile data storage, and stores instructions related to the operation of the computing device 1100. The computing device 1100 can further include a secure element (SE) 1124, which can represent secure storage for cellular wireless system access by the mobile wireless device 102. The computing device 1100 further includes a secure element 1124, which can include an eUICC 108 on which to store one or more eSIMs 208.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for installing and activating an electronic Subscriber Identity Module (eSIM) for access to services of a mobile network operator (MNO) by a mobile wireless device, the method comprising:
by the mobile wireless device:
sending, to a network-based server, a request activation message to initiate eSIM installation and activation;
receiving, from the network-based server, responsive to the request activation message, an initiate activation message including a credential challenge to authenticate a user of the mobile wireless device;

sending, to the network-based server, a credential response for authentication;
receiving, from the network-based server, responsive to successful authentication of the user of the mobile wireless device, an activation ticket indicating the eSIM reserved for the mobile wireless device;
establishing a secure connection to an MNO provisioning server associated with the eSIM;
obtaining, via the secure connection, the eSIM from the MNO provisioning server;
installing the eSIM on an embedded universal integrated circuit card (eUICC) of the mobile wireless device;
sending, to the MNO provisioning server, an indication of successful installation of the eSIM on the eUICC of the mobile wireless device;
attempting to attach to a cellular wireless network associated with the MNO using the eSIM; and
responsive to receipt of a device attach failure message from the cellular wireless network, executing a monitor mode process to retry attaching to the cellular wireless network until successful attachment occurs or a maximum number of retry attempts is reached.

2. The method of claim 1, wherein executing the monitor mode process comprises:
by the mobile wireless device:
configuring a timer for the monitor mode process;
monitoring for successful attachment to the cellular wireless network by attempting to attach to the cellular wireless network and observing corresponding responses received; and
while no successful attachment occurs and before the maximum number of retry attempts is reached, after expiration of the timer, disabling and re-enabling the eSIM before continuing to monitor for successful attachment to the cellular wireless network.

3. The method of claim 1, wherein the initiate activation message includes an integrated circuit card identifier (ICCID) for the eSIM, wherein the eSIM was previously reserved for the mobile wireless device based on a sales order for the mobile wireless device.

4. The method of claim 3, wherein:
the initiate activation message further includes an eUICC identifier (EID) for the eUICC of the mobile wireless device on which the previously reserved eSIM is to be provisioned.

5. The method of claim 3, further comprising:
by the mobile wireless device:
receiving, from a second network-based server responsive to a query, a message including an indication of one or more pending eSIMs reserved for the mobile wireless device;
comparing the ICCID for the eSIM included in the initiate activation message received from the network-based server to corresponding ICCIDs for the one or more pending eSIMs reserved for the mobile wireless device; and
triggering download and installation of the eSIM from the MNO provisioning server when the ICCID for the eSIM matches an ICCID of the corresponding ICCIDs.

6. The method of claim 1, wherein the initiate activation message includes an ICCID for an eSIM of a second mobile wireless device from which subscription for the eSIM is to be transferred to the mobile wireless device.

7. The method of claim 1, further comprising:
by the mobile wireless device:
obtaining, from the network-based server, a network address for the MNO provisioning server after receipt of the activation ticket.

8. A mobile wireless device comprising:
wireless circuitry comprising one or more antennas; and
one or more processors communicatively coupled to the wireless circuitry and to a memory storing instructions that, when executed by the one or more processors, cause the mobile wireless device to install and activate an electronic Subscriber Identity Module (eSIM) by at least:
sending, to a network-based server, a request activation message to initiate eSIM installation and activation;
receiving, from the network-based server, responsive to the request activation message, an initiate activation message including a credential challenge to authenticate a user of the mobile wireless device;
sending, to the network-based server, a credential response for authentication;
receiving, from the network-based server, responsive to successful authentication of the user of the mobile wireless device, an activation ticket indicating the eSIM reserved for the mobile wireless device;
establishing a secure connection to an MNO provisioning server associated with the eSIM;
obtaining, via the secure connection, the eSIM from the MNO provisioning server;
installing the eSIM on an embedded universal integrated circuit card (eUICC) of the mobile wireless device;
sending, to the MNO provisioning server, an indication of successful installation of the eSIM on the eUICC of the mobile wireless device;
attempting to attach, using the eSIM, to a cellular wireless network of an MNO associated with the eSIM; and
responsive to receipt of a device attach failure message from the cellular wireless network, executing a monitor mode process to retry attaching to the cellular wireless network until successful attachment occurs or a maximum number of retry attempts is reached.

9. The mobile wireless device of claim 8, wherein executing the monitor mode process comprises:
by the mobile wireless device:
configuring a timer for the monitor mode process;
monitoring for successful attachment to the cellular wireless network by attempting to attach to the cellular wireless network and observing corresponding responses received; and
while no successful attachment occurs and before the maximum number of retry attempts is reached, after expiration of the timer, disabling and re-enabling the eSIM before continuing to monitor for successful attachment to the cellular wireless network.

10. The mobile wireless device of claim 8, wherein the initiate activation message includes an integrated circuit card identifier (ICCID) for the eSIM, wherein the eSIM was previously reserved for the mobile wireless device based on a sales order for the mobile wireless device.

11. The mobile wireless device of claim 10, wherein:
the initiate activation message further includes an eUICC identifier (EID) for the eUICC of the mobile wireless device on which the previously reserved eSIM is to be provisioned.

12. The mobile wireless device of claim 10, wherein execution of the instructions further causes the mobile wireless device to install and activate the eSIM by at least:
receiving, from a second network-based server responsive to a query, a message including an indication of one or more pending eSIMs reserved for the mobile wireless device;
comparing the ICCID for the eSIM included in the initiate activation message received from the network-based server to corresponding ICCIDs for the one or more pending eSIMs reserved for the mobile wireless device; and
triggering download and installation of the eSIM from the MNO provisioning server when the ICCID for the eSIM matches an ICCID of the corresponding ICCIDs.

13. The mobile wireless device of claim 8, wherein the initiate activation message includes an ICCID for an eSIM of a second mobile wireless device from which subscription for the eSIM is to be transferred to the mobile wireless device.

14. The mobile wireless device of claim 8, wherein execution of the instructions further causes the mobile wireless device to install and activate the eSIM by at least:
obtaining, from the network-based server, a network address for the MNO provisioning server after receipt of the activation ticket.

15. An apparatus configured for operation in a mobile wireless device, the apparatus comprising one or more processors communicatively coupled to a memory storing instructions that, when executed by the one or more processors, cause the mobile wireless device to install and activate an electronic Subscriber Identity Module (eSIM) by at least:
sending, to a network-based server, a request activation message to initiate eSIM installation and activation;
receiving, from the network-based server, responsive to the request activation message, an initiate activation message including a credential challenge to authenticate a user of the mobile wireless device;
sending, to the network-based server, a credential response for authentication;
receiving, from the network-based server, responsive to successful authentication of the user of the mobile wireless device, an activation ticket indicating the eSIM reserved for the mobile wireless device;
establishing a secure connection to an MNO provisioning server associated with the eSIM;
obtaining, via the secure connection, the eSIM from the MNO provisioning server;
installing the eSIM on an embedded universal integrated circuit card (eUICC) of the mobile wireless device;
sending, to the MNO provisioning server, an indication of successful installation of the eSIM on the eUICC of the mobile wireless device;
attempting to attach, using the eSIM, to a cellular wireless network of an MNO associated with the eSIM; and
responsive to receipt of a device attach failure message from the cellular wireless network, executing a monitor mode process to retry attaching to the cellular wireless network until successful attachment occurs or a maximum number of retry attempts is reached.

16. The apparatus of claim 15, wherein executing the monitor mode process comprises:
configuring a timer for the monitor mode process;
monitoring for successful attachment to the cellular wireless network by attempting to attach to the cellular wireless network and observing corresponding responses received; and
while no successful attachment occurs and before the maximum number of retry attempts is reached, after expiration of the timer, disabling and re-enabling the eSIM before continuing to monitor for successful attachment to the cellular wireless network.

17. The apparatus of claim 15, wherein the initiate activation message includes an integrated circuit card identifier (ICCID) for the eSIM, wherein the eSIM was previously reserved for the mobile wireless device based on a sales order for the mobile wireless device.

18. The apparatus of claim 17, wherein:
the initiate activation message further includes an eUICC identifier (EID) for the eUICC of the mobile wireless device on which the previously reserved eSIM is to be provisioned.

19. The apparatus of claim 17, wherein execution of the instructions further causes the mobile wireless device to install and activate the eSIM by at least:
receiving, from a second network-based server responsive to a query, a message including an indication of one or more pending eSIMs reserved for the mobile wireless device;
comparing the ICCID for the eSIM included in the initiate activation message received from the network-based server to corresponding ICCIDs for the one or more pending eSIMs reserved for the mobile wireless device; and
triggering download and installation of the eSIM from the MNO provisioning server when the ICCID for the eSIM matches an ICCID of the corresponding ICCIDs.

20. The apparatus of claim 15, wherein the initiate activation message includes an ICCID for an eSIM of a second mobile wireless device from which subscription for the eSIM is to be transferred to the mobile wireless device.

* * * * *